United States Patent
Jang et al.

(10) Patent No.: US 11,717,959 B2
(45) Date of Patent: Aug. 8, 2023

(54) MACHINE LEARNING METHODS AND APPARATUS FOR SEMANTIC ROBOTIC GRASPING

(71) Applicant: Google LLC, Mountain View, CA (US)

(72) Inventors: Eric Jang, Cupertino, CA (US); Sudheendra Vijayanarasimhan, Pasadena, CA (US); Peter Pastor Sampedro, Oakland, CA (US); Julian Ibarz, Mountain View, CA (US); Sergey Levine, Berkeley, CA (US)

(73) Assignee: GOOGLE LLC, Mountain View, CA (US)

( * ) Notice: Subject to any disclaimer, the term of this patent is extended or adjusted under 35 U.S.C. 154(b) by 789 days.

(21) Appl. No.: 16/622,309

(22) PCT Filed: Jun. 28, 2018

(86) PCT No.: PCT/US2018/039947
§ 371 (c)(1),
(2) Date: Dec. 13, 2019

(87) PCT Pub. No.: WO2019/006091
PCT Pub. Date: Jan. 3, 2019

(65) Prior Publication Data
US 2020/0338722 A1    Oct. 29, 2020

Related U.S. Application Data
(60) Provisional application No. 62/526,211, filed on Jun. 28, 2017.

(51) Int. Cl.
*B25J 9/16*         (2006.01)
*G06N 3/08*        (2023.01)
(Continued)

(52) U.S. Cl.
CPC .............. *B25J 9/163* (2013.01); *G06N 3/008* (2013.01); *G06N 3/045* (2023.01); *G06N 3/08* (2013.01); *G05B 2219/39536* (2013.01)

(58) Field of Classification Search
CPC ........... B25J 9/163; B25J 9/161; G06N 3/008; G06N 3/0454; G06N 3/08; G06N 3/084; G05B 2219/39536; G05B 2219/39298
See application file for complete search history.

(56) References Cited

U.S. PATENT DOCUMENTS

| 2014/0277718 A1 | 9/2014 | Izhikevich et al. |
| 2016/0096270 A1 | 4/2016 | Ibarz Gabardos et al. |

(Continued)

FOREIGN PATENT DOCUMENTS

| CN | 1380846 | 11/2002 |
| CN | 106272427 | 1/2017 |

(Continued)

OTHER PUBLICATIONS

China National Intellectual Property Administration; Office Action issued in Application No. 201880039073.8; 8 pages; dated May 11, 2022.

(Continued)

*Primary Examiner* — Jason Holloway
(74) *Attorney, Agent, or Firm* — Gray Ice Higdon

(57) ABSTRACT

Deep machine learning methods and apparatus related to semantic robotic grasping are provided. Some implementations relate to training a training a grasp neural network, a semantic neural network, and a joint neural network of a semantic grasping model. In some of those implementations, the joint network is a deep neural network and can be trained based on both: grasp losses generated based on grasp predictions generated over a grasp neural network, and semantic losses generated based on semantic predictions (Continued)

generated over the semantic neural network. Some implementations are directed to utilization of the trained semantic grasping model to servo, or control, a grasping end effector of a robot to achieve a successful grasp of an object having desired semantic feature(s).

18 Claims, 16 Drawing Sheets

(51) Int. Cl.
  *G06N 3/008* (2023.01)
  *G06N 3/045* (2023.01)

(56) References Cited

U.S. PATENT DOCUMENTS

| | | | |
|---|---|---|---|
| 2016/0096272 A1 | 4/2016 | Smith et al. | |
| 2019/0077015 A1* | 3/2019 | Shibasaki | B25J 9/163 |
| 2019/0091869 A1* | 3/2019 | Yamazaki | B25J 9/1679 |

FOREIGN PATENT DOCUMENTS

| | | |
|---|---|---|
| CN | 106575504 | 4/2017 |
| CN | 106874914 | 6/2017 |

OTHER PUBLICATIONS

European Patent Office; Communication pursuant to Article 94(3) in Application No. 18743264.6; pp. 8; dated Dec. 2, 2021.

Intellectual Property India; Examination Report issued in Application No. 201927048685; 5 pages; dated Nov. 1, 2021.

Moussa M. A., "Combining Expert Neural Networks Using Reinforcement Feedback for Learning Primitive Grasping Behavior", IEEE Transactions on Neural Networks, vol. 15, No. 3; pp. 629-638; XP011112576, ISSN: 1045-9227, DOI: 10.1109/TNN.2004.824412; dated May 1, 2004.

International Search Report and Written Opinion of PCT Ser. No. PCT/US2018/039947; 7 pages; dated Jan. 16, 2019.

* cited by examiner

MACHINE LEARNING METHODS AND APPARATUS FOR SEMANTIC ROBOTIC GRASPING

BACKGROUND

Many robots are programmed to utilize one or more end effectors to grasp one or more objects. For example, a robot may utilize a grasping end effector such as an "impactive" gripper or "ingressive" gripper (e.g., physically penetrating an object using pins, needles, etc.) to pick up an object from a first location, move the object to a second location, and drop off the object at the second location. Some additional examples of robot end effectors that may grasp objects include "astrictive" end effectors (e.g., using suction or vacuum to pick up an object) and one or more "contigutive" end effectors (e.g., using surface tension, freezing or adhesive to pick up an object), to name just a few.

SUMMARY

This specification is directed generally to machine learning methods and apparatus related to semantic robotic grasping. Some implementations are directed to training a grasp network, a semantic network, and a joint network of a semantic grasping model. In some of those implementations, the grasp network and the semantic network are deep neural networks (i.e., a grasp neural network and a semantic neural network) and are trained independent of one another. In other words, losses generated based on grasp predictions generated over the grasp network during training are utilized to update parameters of the grasp network (and optionally the joint network), without being utilized to update the semantic network. Similarly, losses generated based on semantic predictions generated over the semantic network are utilized to update parameters of the semantic network (and optionally the joint network), without being utilized to update the grasp network. Moreover, in some of those implementations, the joint network is a deep neural network (i.e., a joint neural network) and can be trained based on both: grasp losses generated based on grasp predictions generated over the grasp network, and semantic losses generated based on semantic predictions generated over the semantic network. In this manner, the joint network is trained, at least in part, "jointly", in that its parameters are learned during training based on both: grasp network based losses, and semantic network based losses.

In various implementations, semantic grasp training examples can be utilized to train the grasp network, the semantic network, and the joint network. The semantic grasp training examples can be generated based on grasp attempts by one or more robots. The semantic grasp training examples can each include training example input of: (1) a motion vector that is based on a pose of a grasping end effector of a robot at a corresponding instance of the corresponding grasp attempt, and a pose of the grasping end effector at the final instance of the corresponding grasp attempt; and (2) at least one image that captures at least a portion of the work space of the robot at the corresponding instance. The semantic grasp training examples can each further include training example output of: (1) a grasp success label that indicates whether the grasp of the corresponding grasp attempt was successful, and (2) semantic label(s) for semantic feature(s) (e.g., a class or type) of an object grasped in the corresponding grasp attempt.

In some of those various implementations, the motion vector and the at least one image of the training example input of a training example are applied as input to the joint network to generate joint output (i.e., output from the joint network) based on the applied input. Further, the joint output is applied to both the grasp network and the semantic network. A predicted grasp output is generated using the grasp network based on the joint output, and a predicted semantic output is generated using the semantic network based on the joint output. A grasp loss is determined based on comparison of the predicted grasp output to the grasp success label of the training example output of the training example. Further, a semantic loss is determined based on comparison of the predicted semantic output to the semantic label of the training example output of the training example.

The grasp loss can be utilized to update the parameters of the grasp network and the joint network (e.g., through backpropagation). Further, the semantic loss can be utilized to update the parameters of the semantic network and the joint network (e.g., through backpropagation). In this manner, the grasp network and the semantic network are trained based on their respective loss. Further, the joint network is trained based on both the grasp loss and the semantic loss.

In various implementations, further training of the semantic grasping model may occur via non-semantic grasp training examples and/or semantic (non-grasping) training examples.

For example, non-semantic grasp training examples can each be of the same format as the semantic grasp training examples, except that they omit the semantic label(s) (or contain a "null" value for the semantic labels) of grasped objects. In other words, they do not include training example output that indicates semantic feature(s) of a grasped object (if any). The training example input of a non-semantic grasp training example can be applied to the joint network to generate joint output. Further, the joint output is applied to the grasp network (without necessarily being applied to the semantic network). A predicted grasp output is generated using the grasp network based on the joint output, and a grasp loss is determined based on comparison of the predicted grasp output to the grasp success label of the training example output of the training example. The grasp loss can be utilized to update the parameters of the grasp network and the joint network (e.g., through backpropagation). Notably, with the non-semantic grasp training examples, a semantic loss is not generated and/or is not utilized to update the semantic network and/or the joint network—as the non-semantic grasp training examples lack a labeled semantic output in the training example output. However, the grasp loss can be utilized to improve performance of the grasp network and/or to improve performance of the joint network (e.g., the early visual representations learned by the joint network). Such improvement in performance of the joint network can further improve performance of the semantic network (as it utilizes joint output from the joint network), and can further improve performance of the grasp network (in implementations where it utilizes joint output from the joint network).

Also, for example, semantic (non-grasping) training examples can each be of the same format as the semantic grasp training examples, except that they omit the grasp success label (or contain a "null" value for the grasp success label). In other words, they do not include training example output that indicates whether a grasp was successful. In some implementations, the semantic training examples can include training examples from an image classification (or other feature(s)) dataset, appended with a random, pseudo-random, or otherwise generated motion vector as training example input. For example, a training example can include training example input that includes at least one image, and that is appended with a randomly generated motion vector; and can include training example output that is a class label for an object in the image. The training example input of a semantic training example can be applied to the joint network to generate joint output. Further, the joint output is applied to the semantic network (without necessarily being applied to the grasp network). A predicted semantic output is generated using the semantic network based on the joint output, and a semantic loss is determined based on comparison of the predicted semantic output to the semantic label of the training example output of the training example. The semantic loss can be utilized to update the parameters of the semantic network and the joint network (e.g., through backpropagation). Notably, with the semantic training examples, a grasp loss is not generated and/or is not utilized to update the grasp network and/or the joint network—as the semantic training examples lack a grasp success label in the training example output. However, the semantic loss can be utilized to improve performance of the semantic network and/or to improve performance of the joint network (e.g., the early visual representations learned by the joint network).

Following training, (1) a candidate motion vector that defines a candidate motion (if any) of a grasping end effector of a robot (i.e. motion from one pose to another, additional pose), and (2) at least one image that captures at least a portion of the work space of the robot, can be applied as input to the trained joint network. Further, a joint output can be generated using the trained joint network based on the applied inputs.

The joint output can be applied to the trained semantic network to predict a class and/or other semantic feature of an object in the image.

In some implementations, the joint output is further applied to the trained grasp network to generate, based on the applying, a grasp success measure that directly or indirectly indicates the probability that implementing the candidate motion vector will result in a successful grasp. In some other implementations, the (1) candidate motion vector and (2) the at least one image are instead applied to an additional trained grasp network to generate, based on the applying, the grasp success measure. In those other implementations, the additional trained grasp network is separate from the one utilized in the training of the joint network. For example, the additional trained grasp network can be separate and trained based solely on non-semantic grasp training examples. Accordingly, the additional trained grasp network can be utilized at inference, while the grasp network utilized in training the joint network is not utilized at inference.

The predicted grasp success measure and the predicted semantic feature(s) can then be utilized in servoing performance of grasp attempts by the robot utilizing the grasping end effector. For example, if the grasp success measure satisfies a threshold, and the semantic feature(s) indicate the grasp will likely be of an object having desired object semantic feature(s), then a grasp attempt can be attempted by implementing the end effector motion command, then grasping. This can enable servoing, or controlling, of the grasping end effector to achieve a successful grasp, of an object having desired object semantic features, by the grasping end effector.

Using trained network(s) to achieve a successful grasp of an object having desired object semantic features may enable a robot to perform various actions directed to objects having particular object feature(s), where those particular object feature(s) are dictated by human generated user interface input and/or by another component (e.g., a higher level task planner or a controller). For example, a user may provide user interface input (e.g., spoken, typed) that indicates a desire to grasp an object having one or more particular object feature(s) and the robot may utilize the trained networks to attempt a grasp only when: the grasp is likely to be successful and is likely to be of an object having the particular object feature(s). A robot may therefore attempt to grasp objects in its environment, based on input commands which specify the type of object to pick up, by combining both spatial and semantic reasoning: the robot may determine which objects in its environment belong to the requested type of object, and how one or more of those objects might be grasped successfully. For instance, the user may provide user interface input of "pick up the spoon" and the robot may attempt a grasp based on output generated using a grasp network indicating a grasp is likely to be successful and based on output generated using a semantic network indicating the grasp is likely to be of an object having a classification of "spoon". Improved control and utilization of a robot may therefore be provided.

Other implementations may include a non-transitory computer readable storage medium storing instructions executable by one or more processors (e.g., a central processing unit (CPU), graphics processing unit (GPU), and/or tensor processing unit (TPU)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
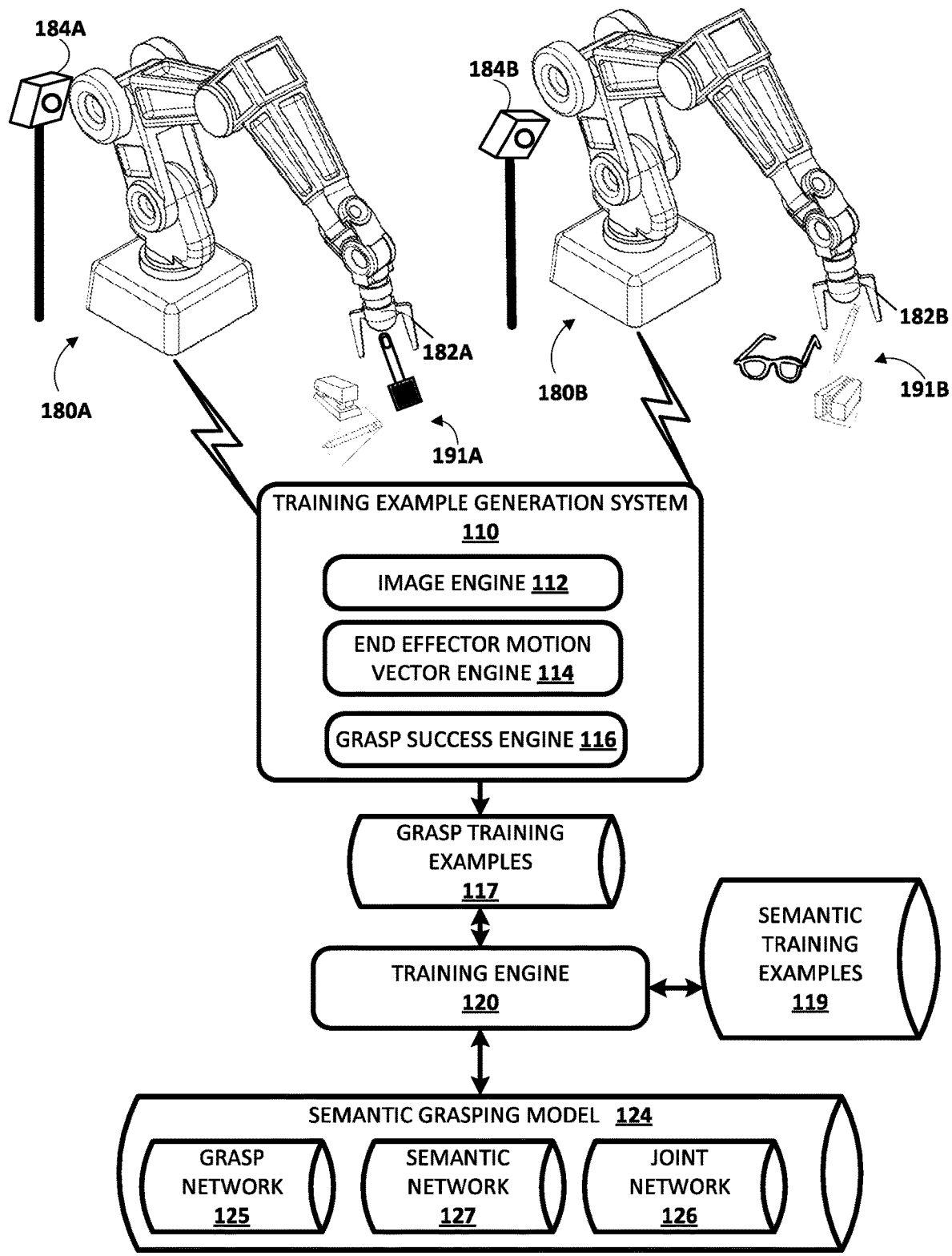
FIG. 1A illustrates an example environment in which grasp attempts may be performed by robots, data associated with the grasp attempts may be utilized to generate grasp training examples, and/or the grasp training examples may be utilized to train one or more networks of a semantic grasping model.

Some implementations of the technology described herein are directed to the task of semantic robotic grasping, in which a robot picks up an object having user-specified semantic feature(s) (e.g., a specified class) using images captured by a camera or other vision component of the robot (e.g., monocular images captured by a monographic camera of the robot).

In robotics, object detection, classification, and grasp planning are typically treated as separate problems to be solved in isolation. Implementations described herein present methods for semantic grasping that instead learn these components (object detection, classification, and grasp planning) together in an end-to-end fashion. In some of those implementations, a "ventral stream" (e.g., a trained semantic network) recognizes object semantics while a "dorsal stream" (e.g., a trained grasp network) simultaneously interprets the geometric (or spatial) relationships necessary to execute successful grasps. In some versions of those implementations, the autonomous data collection capabilities of robots are utilized to obtain a large self-supervised dataset for training the dorsal stream, and semi-supervised label propagation is utilized to train the ventral stream. Various implementations described herein can result in an improvement in grasp accuracy over grasping systems whose components are not learned end-to-end. Furthermore, jointly training network(s) of the semantic grasping model with auxiliary data as described herein (e.g., auxiliary data that includes non-semantic grasping datasets and/or non-grasping semantic datasets) can additionally or alternatively improve semantic grasping performance.

In various implementations described herein, visual reasoning that is both spatial and semantic is divided into two streams: a ventral stream that reasons about object identity in a spatially-invariant way, and a dorsal stream that reasons about spatial relationships without regard for semantics. In some of those various implementations, the dorsal stream is modeled by a neural network (grasp network) that predicts whether a particular grasping action will result in a successful grasp. The ventral stream is modeled by another neural network (semantic network) trained to predict what type of object will be picked up (or other feature(s) of the object). One example of a two-stream model described herein is a two-branch architecture (e.g., FIG. 1B) that shares image and end effector motion vector processing (joint network) before branching out to grasp-specific (grasp network) and semantic feature-specific (semantic network) branches. The two-stream approach can provide for better grasp accuracy than single-stream approaches. The precision with which objects can be recognized and localized can therefore be improved.

In some implementations, a combination of self-supervised robotic data collection and label propagation are utilized to construct a large object classification dataset for use in training the neural network models described herein. Further, in some implementations, the dorsal and/or ventral streams are additionally trained independently utilizing domain transfer, by integrating auxiliary spatial (or non-semantic) information from non-semantic grasping datasets and auxiliary semantic information from image classification datasets. Use of auxiliary spatial information (or data) in training may improve grasping performance. Use of auxiliary semantically labelled information (or data) without grasping actions may improve generalization of the model.

In some implementations, a semantic grasping model described herein takes, as input, images $I_t$, $I_0$, which correspond to the current image seen by a robot's camera ($I_t$), and an initial image seen by the robot's camera during a grasping episode ($I_0$). The initial image can be recorded before the grasping episode begins and can be included to allow the system to handle self-occlusions caused by the robot arm. The semantic grasping model also receives as input a candidate end effector motion vector, such as a task-space motion command $a_t$ that can be parameterized by a Cartesian displacement of the gripper along with a vertical rotation of the gripper. The semantic grasping model outputs $p(g, c | I_t, a_t)$, the joint probability that executing the command $a_t$ will result in g, the event that an object is grasped and c, the event that the grasped object is the correct semantic label. A servoing function samples grasps (e.g., using an optimization technique) and uses the semantic grasping model to choose the grasp with the highest probability of picking up the desired object.

In some of those implementations, the semantic grasping model is trained by supervising the model's ability to detect and grasp an object independently of recognizing the object's class. This can be done by effectively dividing the semantic grasping model into two streams: a ventral stream that reasons about object identity $p(c | I_t, a_t, g)$ in a grasp-invariant manner, and a dorsal stream that reasons about spatial relationships $p(g | I_t, a_t)$ without regard for semantics. For example, the prediction problem can be subdivided into a dorsal stream that is trained based on losses generated based on non-semantic grasping data (e.g., training example outputs whose labels are success or failure) using a binary cross entropy loss, while the ventral stream is trained on losses generated based on semantic grasping data from successful grasps (e.g., training example outputs whose labels indicate presence or absence of each of multiple object classes (or other semantic feature(s))) using a standard cross entropy loss. The model learns to infer where actions will send the gripper, and implicitly attends to that location in order to extract its spatial relevance to grasping and semantic identity.

The semantic grasping model can include a joint network, such as a joint network that is a deep convolutional neural network (CNN) that pre-processes the input image (e.g., $I_t, I_0$) with a few convolutional layers, and is merged with an action embedding (embedding of a candidate end effector motion vector) to generate a joint output. In some implementations, the joint output is then provided to two separate networks (grasp network and semantic network) that are branches from the joint network and that are independently supervised on grasp success or class (or other semantic feature(s)) prediction. The outputs of these branches comprise the dorsal and ventral streams, which are multiplied together (or otherwise considered together) at inference to compute the value function of the policy. In some implementations, at inference, the ventral probability is smoothed via min (p (c|I$_t$, a$_t$, g)+0.5, 1) (or other function), prior to multiplying with the dorsal probability (or otherwise considering together), which allows the robot to pick up an object even if it is unsure about the semantic identity of an object. The grasp network and/or the semantic network can each be, for example, a deep CNN that includes one or more convolutional layers.

The two-stream decomposition further permits the mixing-and-matching from dorsal and ventral streams from different models at inference time. Accordingly, in some implementations a deeper grasp CNN trained only to predict the dorsal stream (an additional grasp neural network) can be used to predict the dorsal/grasp success outcome, while a separate semantic network can be used to predict the ventral/semantic outcome, in combination with the joint network. In some implementations, such usage of a deeper CNN trained only to predict the dorsal stream can outperform two-branch model implementations in non-semantic grasping capability.

In some implementations, instead of using a deep CNN that implicitly attends to an object using the end effector motion vector, an explicit attention mechanism is used to improve the semantic grasping models ability to extract a representation of visual features that are invariant to an object's location. One such attention mechanism is soft keypoint attention, in which the output action of a convolutional layer is normalized across the spatial extent via a softmax $s_{cij} = e^{a_{cij}/T} / \Sigma_{i'j'} e^{a_{ci'j'}/T}$. The spatial softmax for each channel is then used as weights for spatially averaging a mesh grid $f_c = (\Sigma_i i \cdot s_{cij}, \Sigma_j j \cdot s_{cij})$, which yields expected screen coordinates for salient visual features in that channel. These features are normalized to mean 0 and standard deviation 1 prior to classification (or other semantic feature(s) determination), since class identity should be invariant to where the spatial features are located and their scale.

Since soft keypoint attention returns a low-dimensional representation of attended features in the form of coordinates, the dorsal and ventral branches of the semantic grasping model can include fewer fully-connected layers than if soft keypoint attention was not utilized. Although soft keypoint attention will not necessarily contribute to substantially better performance than simply using a deeper CNN, it can reduce the number of parameters in the model (thereby reducing the size of the model) and/or accelerate training (thereby leading to consumption of less computational resources in training).

Turning now to the Figures, FIG. 1A illustrates an example environment in which grasp attempts may be performed by robots (e.g., robots 180A, 180B, and/or other robots), data associated with the grasp attempts may be utilized to generate grasp training examples of grasp training examples database 117, and/or the grasp training examples may be utilized to train various networks 125, 126, and/or 127 of a semantic grasping model 124.

As described in more detail herein, the grasp training examples of grasp training examples database 117 can include semantic grasp training examples that include training example output that identifies semantic feature(s) (e.g., a class) of an object grasped in a corresponding grasp attempt of the training example. The grasp training examples of grasp training examples database 117 can also include non-semantic grasp training examples that do not include training example output that identifies semantic feature(s) (e.g., a class) of an object grasped in a corresponding grasp attempt of the training example. Additional semantic training examples database 119 are also illustrated in FIG. 1A, and includes semantic training examples that can also be utilized to train the semantic network 127 and/or the joint network 126 of the semantic grasping model 124. As described in more detail herein, the semantic training examples can be non-grasp training examples, in that they are not generated based on a grasp attempt.

Figure 2:
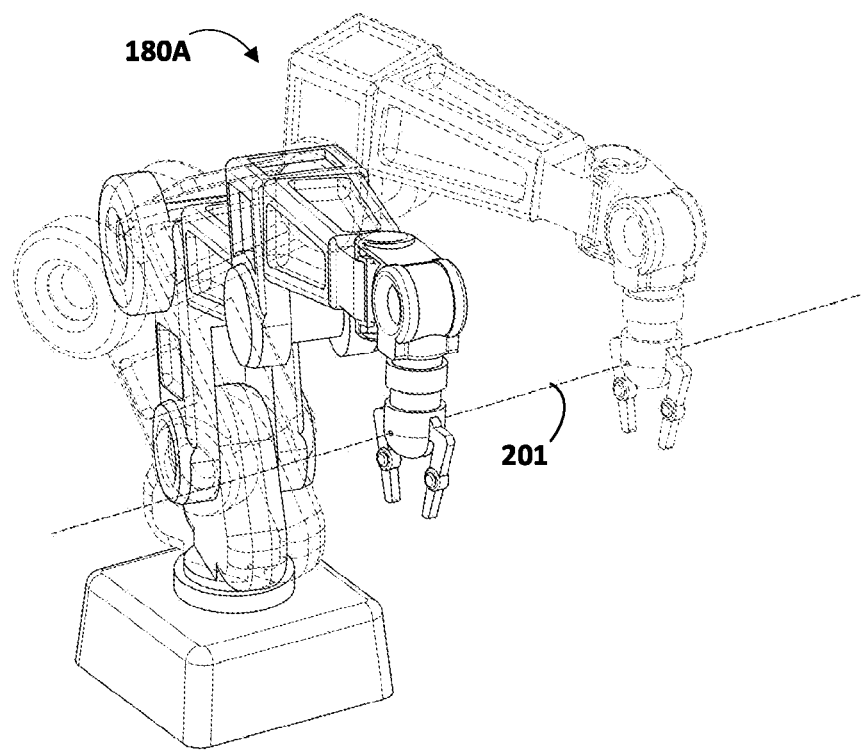
FIG. 2 illustrates one of the robots of FIG. 1 and an example of movement of a grasping end effector of the robot along a path.

Example robots 180A and 180B are illustrated in FIG. 1A. Robots 180A and 180B are here "robot arms" having multiple degrees of freedom to enable traversal of grasping end effectors 182A and 182B along any of a plurality of potential paths to position the grasping end effectors 182A and 182B in desired locations. For example, with reference to FIG. 2, an example of robot 180A traversing its end effector along a path 201 is illustrated. FIG. 2 includes a phantom and non-phantom image of the robot 180A showing two different poses of a set of poses struck by the robot 180A and its end effector in traversing along the path 201. Referring again to FIG. 1A, robots 180A and 180B each further controls the two opposed "claws" of their corresponding grasping end effector 182A, 182B to actuate the claws between at least an open position and a closed position (and/or optionally a plurality of "partially closed" positions). Any other suitable robot having any suitable end effectors may be used, as described further below.

Example vision components 184A and 184B are also illustrated in FIG. 1A. In FIG. 1A, vision components 184A is mounted at a fixed pose relative to the base or other stationary reference point of robot 180A. Vision components 184B is also mounted at a fixed pose relative to the base or other stationary reference point of robot 180B. As illustrated in FIG. 1A, the pose of the vision components 184A relative to the robot 180A is different than the pose of the vision components 184B relative to the robot 180B. As described herein, in some implementations this may be beneficial to enable generation of varied training examples that can be utilized to train various neural networks to produce corresponding output that is robust to and/or independent of camera calibration. Vision components 184A and 184B each include one or more sensors and can utilize output from the sensors to generate images related to shape, color, depth, and/or other features of object(s) that are in the line of sight of the sensors. The vision components 184A and 184B may be, for example, monographic cameras, stereographic cameras, and/or laser scanners. A laser scanner includes one or more lasers that emit light and one or more sensors that collect data related to reflections of the emitted light. A laser scanner may be, for example, a time-of-flight laser scanner or a triangulation based laser scanner and may include a position sensitive detector (PSD) or other optical position sensor.

The vision component 184A has a field of view of at least a portion of the workspace of the robot 180A, such as the portion of the workspace that includes example objects 191A. Although resting surface(s) for objects 191A are not illustrated in FIG. 1A, those objects may rest on a table, a tray, and/or other surface(s). Objects 191A include a spatula, a stapler, and a pencil. However, the method described herein may be utilized with any other suitable objects. In other implementations more objects, fewer objects, additional objects, and/or alternative objects may be provided during all or portions of grasp attempts of robot 180A as described herein. For example, in some implementations objects having one or more of the features that are the same (e.g., objects all having a first classification) may be provided during some grasp attempts of robot 180A, objects having one or more different features that are the same (e.g., objects all having a second classification) may be provided during some other grasp attempts of robot 180A, etc.

The vision component 184B has a field of view of at least a portion of the workspace of the robot 180B, such as the portion of the workspace that includes example objects 191B. Although resting surface(s) for objects 191B are not illustrated in FIG. 1A, they may rest on a table, a tray, and/or other surface(s). Objects 191B include a pencil, a stapler, and glasses, or any other suitable objects. In other implementations more objects, fewer objects, additional objects, and/or alternative objects may be provided during all or portions of grasp attempts of robot 180B as described herein. For example, in some implementations objects having one or more of the features that are the same (e.g., objects all having a first classification) may be provided during some grasp attempts of robot 180B, objects having one or more different features that are the same (e.g., objects all having a second classification) may be provided during some other grasp attempts of robot 180B, etc.

Although particular robots 180A and 180B are illustrated in FIG. 1A, additional and/or alternative robots may be utilized, including additional robot arms that are similar to robots 180A and 180B, robots having other robot arm forms, robots having a humanoid form, robots having an animal form, robots that move via one or more wheels (e.g., self-balancing robots), submersible vehicle robots, an unmanned aerial vehicle ("UAV"), and so forth. Also, although particular grasping end effectors are illustrated in FIG. 1A, additional and/or alternative end effectors may be utilized, such as alternative impactive grasping end effectors (e.g., those with grasping "plates", those with more or fewer "digits"/"claws"), "ingressive" grasping end effectors, "astrictive" grasping end effectors, or "contigutive" grasping end effectors, or non-grasping end effectors. Additionally, although particular mountings of vision components 184A and 184B are illustrated in FIG. 1A, additional and/or alternative mountings may be utilized. For example, in some implementations, vision components may be mounted directly to robots, such as on non-actuable components of the robots or on actuable components of the robots (e.g., on the end effector or on a component close to the end effector). Also, for example, in some implementations, a vision component may be mounted on a non-stationary structure that is separate from its associated robot and/or may be mounted in a non-stationary manner on a structure that is separate from its associated robot.

Robots 180A, 180B, and/or other robots may be utilized to perform a large quantity of grasp attempts and data associated with the grasp attempts may be utilized by the training example generation system 110 to generate grasp training examples of grasp training examples database 117. In some implementations, all or aspects of training example generation system 110 may be implemented on robot 180A and/or robot 180B (e.g., via one or more processors of robots 180A and 180B). For example, robots 180A and 180B may each include an instance of the training example generation system 110. In some implementations, all or aspects of training example generation system 110 may be implemented on one or more computer systems that are separate from, but in network communication with, robots 180A and 180B.

Each grasp attempt by robot 180A, 180B, and/or other robots consists of T separate time steps or instances. At each time step, a current image ($I_t^i$) captured by the vision sensor of the robot performing the grasp attempt is stored, the current pose ($p_t^i$) of the end effector is also stored, and the robot chooses a path (translational and/or rotational) along which to next move the gripper. At the final time step T, the robot actuates (e.g., closes) the gripper and stores additional data and/or performs one or more additional actions to enable evaluation of the success of the grasp. The grasp success engine 116 of training example generation system 110 evaluates the success of the grasp, generating a grasp success label ($sl_i$) and/or grasped object label(s) ($ol_i$), where the grasped object label(s) indicates semantic feature(s) of a grasped object (if any object is actually grasped).

Each grasp attempt results in T grasp training examples, represented by ($I_t^i, p_T^i - p_t^i, sl_i, ol_i$) or ($I_t^i, p_T^i - p_t^i, sl_i, ol_i$). That is, each grasp training example includes at least the image observed at that time step ($I_t^i$), the end effector motion vector ($p_T^i - p_t^i$) from the pose at that time step to the one that is eventually reached (the final pose of the grasp attempt), and the grasp success label ($l_i$). Semantic grasp training examples also include grasped object label(s) ($ol_i$) of the grasp attempt. Each end effector motion vector may be determined by the end effector motion vector engine 114 of training example generation system 110. For example, the end effector motion vector engine 114 may determine a transformation between the current pose and the final pose of the grasp attempt and use the transformation as the end effector motion vector. The grasp training examples for the plurality of grasp attempts of a plurality of robots are stored by the training example generation system 110 in grasp training examples database 117.

The data generated by sensor(s) associated with a robot and/or the data derived from the generated data may be stored in one or more non-transitory computer readable media local to the robot and/or remote from the robot. In some implementations, the current image may include multiple channels, such as a red channel, a blue channel, a green channel, and/or a depth channel. Each channel of an image defines a value for each of a plurality of pixels of the image, such as a value from 0 to 255 for each of the pixels of the image. In some implementations, each of the training examples may include the current image and an additional image for the corresponding grasp attempt, where the additional image does not include the grasping end effector or includes the end effector in a different pose (e.g., one that does not overlap with the pose of the current image). For instance, the additional image may be captured after any preceding grasp attempt, but before end effector movement for the grasp attempt begins and when the grasping end effector is moved out of the field of view of the vision sensor. The current pose and the end effector motion vector from the current pose to the final pose of the grasp attempt may be represented in task-space, in joint-space, or in another space. For example, the end effector motion vector may be represented by five values in task-space: three values defining the three-dimensional (3D) translation vector, and two values representing a sine-cosine encoding of the change in orientation of the end effector about an axis of the end effector.

In some implementations, the grasp success label is a binary label, such as a "0/successful" or "1/not successful" label. In some implementations, the grasp success label may be selected from more than two options, such as 0, 1, and one or more values between 0 and 1. For example, "0" may indicate a confirmed "not successful grasp", "1" may indicate a confirmed successful grasp, "0.25" may indicate a "most likely not successful grasp" and "0.75" may indicate a "most likely successful grasp."

In some implementations, the grasped object label(s) of semantic grasp training examples each indicate whether a corresponding feature is present in a corresponding grasped object. For example, a grasped object label for a grasped object may indicate to which of one or more object classes the object belongs. Object classes of various granularities may be utilized. The grasped object labels may each be binary (e.g., feature present or not present) or selected from more than two options (e.g., feature likely not present, most likely not present, likely present, most likely present). As described herein, the grasp success engine 116 may utilize one or more techniques to assign a grasped object label to a grasp attempt. For example, the grasp success engine 116 may assign a grasped object label to a grasp attempt based on that grasp attempt being from a collection of objects all having that label (e.g., a "toothbrush" label when an object is grasped from a plurality of objects that are all "toothbrushes"). Also, for example, the grasp success engine 116 may capture an image of an object grasped in a grasp attempt (e.g., by moving the grasping end effector in front of a vision sensor while it is still grasping the object), and utilize the captured image to determine the grasped object label. For instance, the grasp success engine 116 may provide the captured image to computing devices of one or more human reviewers and utilize input from the one or more human reviewers (via their corresponding computing devices) to determine the grasped object label. Alternatively, the grasped object label may be determined in any other suitable manner.

The training engine 120 trains one or more of the networks 125, 126, and 127 of semantic grasping model 124 based on grasp training examples of grasp training examples database 117. The training engine 120 can also train the semantic network 127 and optionally joint network 126 based on the additional semantic training examples 119. In various implementations, the training engine 120 trains the grasp network 125 and the semantic network 127 independent of one another. In other words, the training engine 120 utilizes losses generated based on grasp predictions generated over the grasp network 125 during training to update parameters of the grasp network 125 (and optionally the joint network 126), without updating the semantic network 127 based on such losses. Similarly, the training engine 120 utilizes losses generated based on semantic predictions generated over the semantic network 127 to update parameters of the semantic network 127 (and optionally the joint network 126), without updating the grasp network 125 based on such losses. Moreover, in some of those implementations, the joint network 126 can be trained based on both: grasp losses generated based on grasp predictions generated over the grasp network 125, and semantic losses generated based on semantic predictions generated over the semantic network 127. In this manner, the training engine 120 trains the joint network 126, at least in part, "jointly", in that it updates parameters of the joint network 126 based on both: losses generated based on output from the grasp network 125, and losses generated based on output from the semantic network 127.

Additional description of implementations of performing grasp attempts, generating training data based on the grasp attempts, and training the semantic grasping model 124 is provided below with reference to FIGS. 3-7.

Figure 1B:
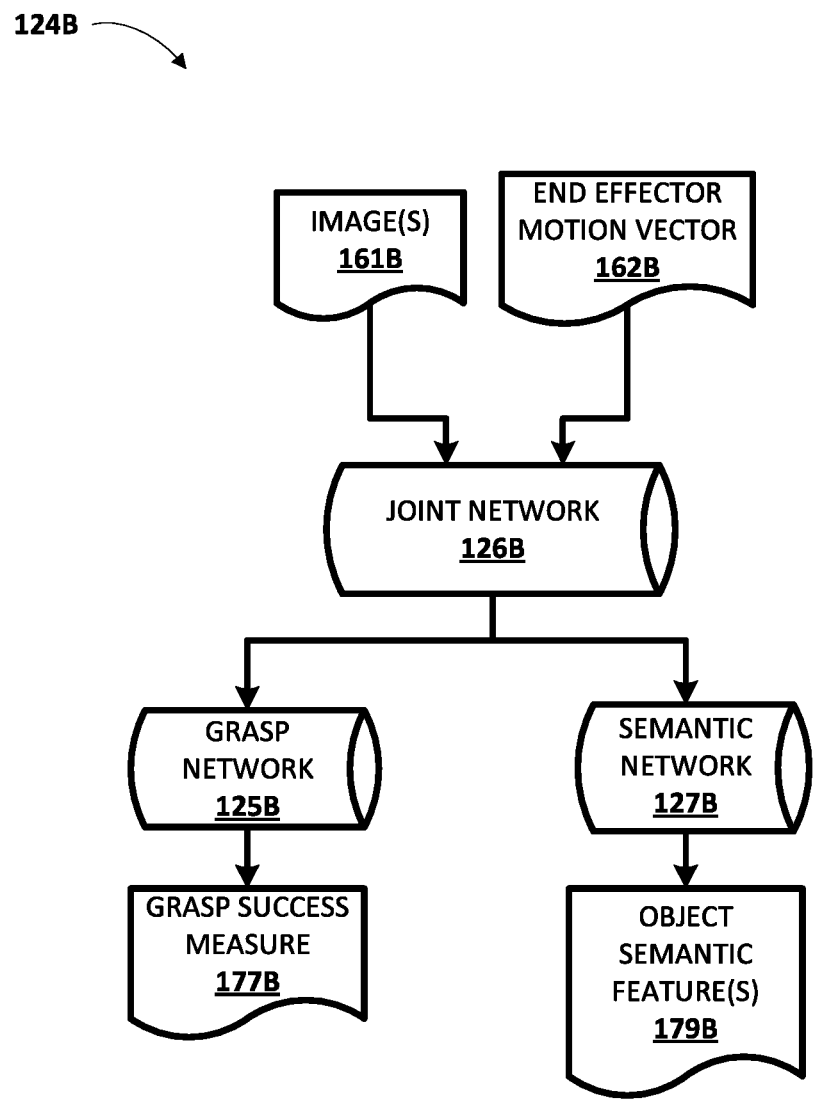
FIG. 1B illustrates one implementation of the networks of the semantic grasping model of FIG. 1A, and example data that may be applied to, and generated over, the networks.

FIG. 1B illustrates one implementation of the networks 125, 126, 127 of the semantic grasping model 124 of FIG. 1A, and example data that may be applied to, and generated using, the networks. In the implementation of FIG. 1B, the semantic grasping model is referenced as 124B to illustrate it is one implementation of the semantic grasping model 124 of FIG. 1A. Further, the networks of the semantic grasping model 124B are referenced as 125B, 126B, and 127B to illustrate they are implementations of the networks 125, 126, and 127 of the networks 125, 126, and 127 of FIG. 1A.

In some implementations, one or more processors of a robot may apply and/or generate the data of FIG. 1B based on the networks 125B, 126B, and 127B. For instance, the one or more processors may apply and/or generate the data of FIG. 1B during a given iteration (e.g., control cycle) that is preceded and/or followed by other iteration(s) where corresponding data is likewise generated and/or applied. Further, during a given iteration multiple candidate end effector motion vectors can be considered, and one of the considered candidate end effectors utilized based on it generating a grasp success measure that is most indicative of a successful grasp. For example, an optimization technique can be utilized to sample a plurality of candidate end effector motion vectors in a given iteration, each of those end effector motion vectors processed (along with the same image(s) 161C) using the semantic grasping model 124B, and one of the sampled candidate end effector motion vectors selected for use in generating control commands in the given iteration.

In FIG. 1B, one or more images 161B are applied as input to the joint network 126B, such as a current image and optionally an additional image (e.g., an image that captures the same scene as the current image but omits the grasping end effector). An end effector motion vector 162B is also applied to the joint network 126B. In some implementations, the image(s) 161B are applied to an initial layer of the joint network 126B and the end effector motion vector 162B is applied to a downstream layer of the joint network 126B.

The joint network 126B is a neural network, such as a CNN that includes one or more convolution layers (e.g., multiple convolution layers with pooling layers interspersed between some of the layers). Joint output is generated using the joint network 126B by processing of the applied image (s) and end effector motion vector 162B using the learned/trained parameters of the joint network 126B. The joint output generated over the joint network 126B is applied to both the grasp network 125B and the semantic network 127B.

A grasp success measure 177B is generated using the grasp network 125B by processing of the applied joint output using the learned parameters of the grasp network 125B. The grasp network 125B is a neural network, such as a CNN that includes one or more convolution layers (e.g., multiple convolution layers with pooling layers interspersed between some of the layers). The grasp success measure 177B indicates a predicted likelihood that implementing the end effector motion vector 162B (e.g., providing control commands to cause a robot end effector to execute the end effector motion), and then attempting a grasp, would lead to successful grasp of an object.

One or more object semantic features 179B are generated over the semantic network 127B by processing of the applied joint output using the learned parameters of the semantic network 127B. The semantic network 127B is a neural network, such as a CNN that includes one or more convolution layers (e.g., multiple convolution layers with pooling layers interspersed between some of the layers). The object semantic feature(s) 179B indicate predicted semantic feature(s) of an object that would be grasped if the end effector motion vector 162B were implemented, and then a grasp attempted. For example, the object semantic feature(s) 179B may indicate to which of one or more classes an object belongs such as classes of "eraser", "scissors", "comb", "shovel", "torch", "toy", "hairbrush", etc., and/or other class(es) of greater or lesser granularity. For instance, the semantic feature(s) 180B may indicate, for each of a plurality of classes, a corresponding likelihood that the object has the class.

One or more processors of a robot may determine whether to execute the end effector motion vector 162B and attempt a grasp, based on the grasp measure 177B and the object semantic feature(s) 179B. For example, one or more desired object semantic features may be provided (e.g., via user interface input) and a grasp attempted based on the object semantic feature(s) 179B indicating those semantic features and based on the grasp measure 177B and/or a grasp measure of a prior iteration satisfying one or more criteria. Additional description of implementations of utilizing a semantic grasping model is provided below with reference to FIGS. 9 and 10.

Figure 1C:
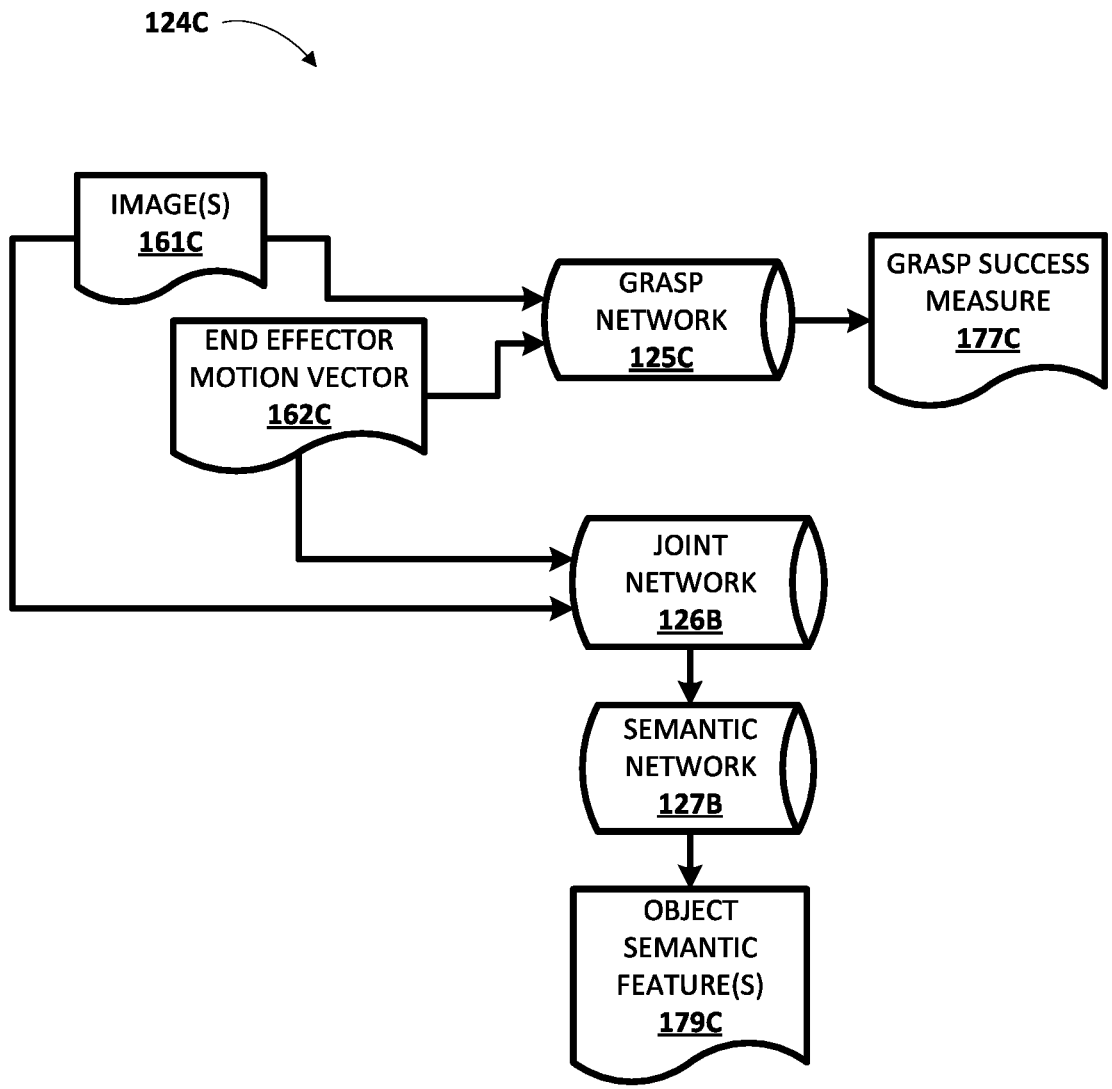
FIG. 1C illustrates another implementation of the networks of the semantic grasping model of FIG. 1A, and example data that may be applied to, and generated over, the networks.

FIG. 1C illustrates another implementation of the networks 125, 126, 127 of the semantic grasping model 124 of FIG. 1A, and example data that may be applied to, and generated over, the networks. In the implementation of FIG. 1C, the semantic grasping model is referenced as 124C to illustrate it is another implementation of the semantic grasping model 124 of FIG. 1A. Further, the joint network 126B and the semantic network 127B are referenced in FIG. 1C by the same reference numbers as in FIG. 1B, to indicate that they are the same as the corresponding networks of FIG. 1B. However, grasp network 125C is referenced as 125C to illustrate that is another implementation of the grasp network 125 of FIG. 1A. The joint network 126B and the semantic network 127B can be trained end to end with the grasp network 125B of FIG. 1B, as described herein. However, in FIG. 1C the grasp network 125B is not utilized at inference time. Instead, a separately trained grasp network 125C is utilized. In other words, although the grasp network 125B may be utilized during training, at inference, the semantic grasping model 124C of FIG. 1C includes a separately trained grasp network 125C in lieu of the grasp network 125B.

In some implementations, one or more processors of a robot may apply and/or generate the data of FIG. 1C based on the networks 125C, 126B, and 127B. For instance, the one or more processors may apply and/or generate the data of FIG. 1C during a given iteration (e.g., control cycle) that is preceded and/or followed by other iteration(s) where corresponding data is likewise generated and/or applied. Further, during a given iteration multiple candidate end effector motion vectors can be considered, and one of the considered candidate end effectors utilized based on it generating a grasp success measure that is most indicative of a successful grasp. For example, an optimization technique can be utilized to sample a plurality of candidate end effector motion vectors in a given iteration, each of those end effector motion vectors processed (along with the same image(s) 161C) using the semantic grasping model 124C, and one of the sampled candidate end effector motion vectors selected for use in generating control commands in the given iteration.

In FIG. 1C, one or more images 161C are applied as input to the grasp network 125C, such as a current image and optionally an additional image (e.g., an image that captures the same scene as the current image but omits the grasping end effector). An end effector motion vector 162C is also applied to the grasp network 125C. In some implementations, the image(s) 161C are applied to an initial layer of the grasp network 125C and the end effector motion vector 162C is applied to a downstream layer of the grasp network 125C. The grasp network 125C generates, based on the applied image(s) 161C and end effector motion vector 162C, a grasp measure 177C.

In FIG. 1C, the image(s) 161C and the end effector motion vector 162C are also applied as input to the joint network 126B. In some implementations, the image(s) 161C are applied to an initial layer of the joint network 126B and the end effector motion vector 162C is applied to a downstream layer of the joint network 126B. Joint output is generated over the joint network 126B by processing of the applied image(s) 161C and end effector motion vector 162B using the learned/trained parameters of the joint network 126B. The joint output generated over the joint network 126B is applied to the semantic network 127B.

One or more semantic features 179C are generated over the semantic network 127B by processing of the applied joint output using the learned parameters of the semantic network 127B. The semantic feature(s) 179C indicate predicted semantic feature(s) of an object that would be grasped if the end effector motion vector 162C were implemented, and then a grasp attempted. For example, the semantic feature(s) 179C may indicate to which of one or more classes an object belongs.

One or more processors of a robot may determine whether to execute the end effector motion vector 162C and attempt a grasp, based on the grasp measure 177C and the semantic feature(s) 179C. For example, one or more desired object semantic features may be provided (e.g., via user interface input) and a grasp attempted based on the semantic feature (s) 179C indicating those semantic features and based on the grasp measure 177C and/or a grasp measure of a prior iteration satisfying one or more criteria. Additional description of implementations of utilizing a semantic grasping model is provided below with reference to FIGS. 9 and 10.

Figure 3:
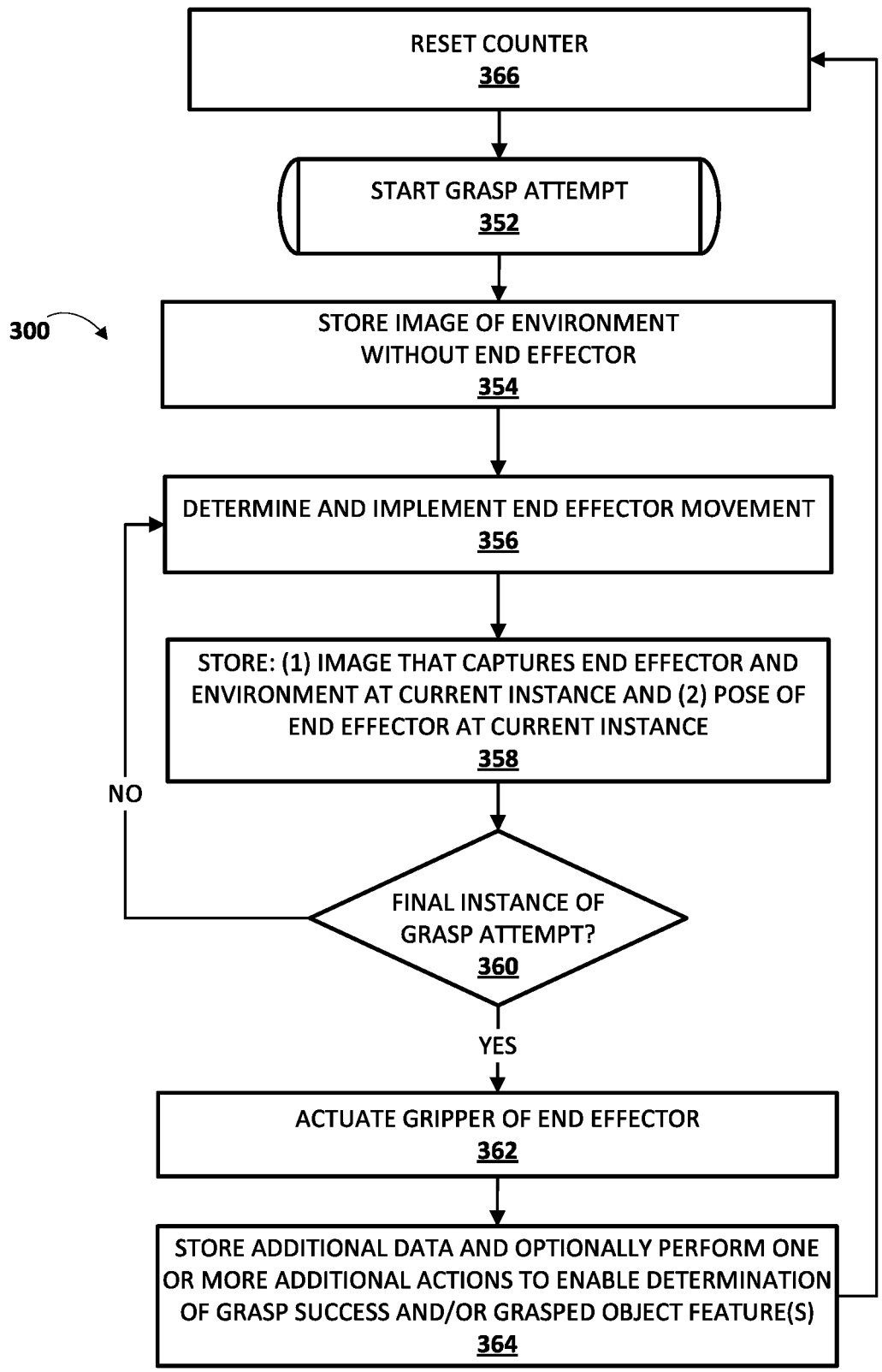
FIG. 3 is a flowchart illustrating an example method of performing grasp attempts and storing data associated with the grasp attempts.

FIG. 3 is a flowchart illustrating an example method 300 of performing grasp attempts and storing data associated with the grasp attempts. For convenience, the operations of the flow chart are described with reference to a system that performs the operations. This system may include one or more components of a robot, such as a processor and/or robot control system of robot 180A, 180B, 1125, and/or other robot. Moreover, while operations of method 300 are shown in a particular order, this is not meant to be limiting. One or more operations may be reordered, omitted or added.

At block 352, the system starts a grasp attempt. At block 354, the system stores an image of an environment without an end effector present in the image. For example, the system may move the grasping end effector out of the field of view of the vision sensor (i.e., not occluding the view of the environment) and capture an image at an instance when the grasping end effector is out of the field of view. The image may then be stored and associated with the grasp attempt.

At block 356, the system determines and implements an end effector movement. For example, the system may generate one or more motion commands to cause one or more of the actuators that control the pose of the end effector to actuate, thereby changing the pose of the end effector.

In some implementations and/or iterations of block 356, the motion command(s) may be random within a given space, such as the work-space reachable by the end effector, a restricted space within which the end effector is confined for the grasp attempts, and/or a space defined by position and/or torque limits of actuator(s) that control the pose of the end effector. Random as used herein may include truly random or pseudo-random.

In some implementations, in the first iteration of block 356 for each grasp attempt, the end effector may be "out of position" based on it being moved out of the field of view at block 354. In some of those implementations, prior to the first iteration of block 356 the end effector may be randomly or otherwise moved "back into position". For example, the end effector may be moved back to a set "starting position" and/or moved to a randomly selected position within a given space.

At block 358, the system stores: (1) an image that captures the end effector and the environment at the current instance of the grasp attempt and (2) the pose of the end effector at the current instance. For example, the system may store a current image generated by a vision sensor associated with the robot and associate the image with the current instance (e.g., with a timestamp). Also, for example the system may determine the current pose of the end effector based on data from one or more joint position sensors of joints of the robot whose positions affect the pose of the robot, and the system may store that pose. The system may determine and store the pose of the end effector in task-space, joint-space, or another space.

At block 360, the system determines whether the current instance is the final instance for the grasp attempt. In some implementations, the system may increment an instance counter at block 352, 354, 356, or 358 and/or increment a temporal counter as time passes—and determine if the current instance is the final instance based on comparing a value of the counter to a threshold. For example, the counter may be a temporal counter and the threshold may be 3 seconds, 4 seconds, 5 seconds, and/or other value. In some implementations, the threshold may vary between one or more iterations of the method 300.

If the system determines at block 360 that the current instance is not the final instance for the grasping attempt, the system returns to block 356, where it determines and implements another end effector movement, then proceeds to block 358 where it stores an image and the pose at the current instance. Through multiple iterations of blocks 356, 358, and 360 for a given grasp attempt, the pose of the end effector will be altered by multiple iterations of block 356, and an image and the pose stored at each of those instances. In many implementations, blocks 356, 358, 360, and/or other blocks may be performed at a relatively high frequency, thereby storing a relatively large quantity of data for each grasp attempt.

If the system determines at block 360 that the current instance is the final instance for the grasping attempt, the system proceeds to block 362, where it actuates the gripper of the end effector. For example, for an impactive gripper end effector, the system may cause one or more plates, digits, and/or other members to close. For instance, the system may cause the members to close until they are either at a fully closed position or a torque reading measured by torque sensor(s) associated with the members satisfies a threshold.

At block 364, the system stores additional data and optionally performs one or more additional actions to enable determination of the success of the grasp of block 360 and/or to enable determination of grasped object features for an object grasped at block 360 (if any). In some implementations, the additional data stored to enable determination of success of the grasp is a position reading, a torque reading, and/or other reading from the grasping end effector. For example, a position reading that is greater than some threshold (e.g., 1 cm) following block 362 may indicate a successful grasp (e.g., may indicate that the grasping end effector is grasping some object since it can close beyond the threshold). In some implementations, the additional data stored to enable determination of grasped object features for an object grasped at block 360 is an indication of one or more object features shared by all objects available for grasp during the grasp attempt. For instance, in the grasp attempt only paintbrushes may be available in the working space of the robot and an object feature indicating a classification of "paintbrush" may be stored. The object feature(s) shared by all of the objects in a grasp attempt may be determined based on an operator provided indication and/or a sensed indication (e.g., a machine-readable code provided in the working space and captured by the vision sensor that indicates the object feature(s)).

In some implementations, at block 364 the system additionally and/or alternatively: (1) maintains the end effector in the actuated (e.g., closed) position and moves the end effector and any object that may be grasped by the end effector to a position close to a vision sensor; and (2) captures an image with the vision sensor when the end effector (and any grasped object) are in the position close to the vision sensor. In some of those implementations, the system may only move the end effector and/or capture such an image if it is first determined based on other data that a grasp is potentially successful (e.g., if a position reading indicates a successful grasp). As described herein, such a captured image may be subsequently utilized to determine if the grasp attempt was successful and/or to determine one or more grasped object features of the object grasped by the end effector. For example, the captured image may be provided to computing devices of one or more human reviewers who may utilize their computing devices to indicate, based on the captured image, whether the grasp was successful and/or to indicate one or more grasped object features of the object being grasped in the captured image. Alternatively, an indication of whether the grasp was successful and/or an indication of one or more grasped object features of the object being grasped in the captured image may be provided in any other suitable manner.

At block 366, the system resets the counter (e.g., the instance counter and/or the temporal counter), and proceeds back to block 352 to start another grasp attempt.

In some implementations, the method 300 of FIG. 3 may be implemented on each of a plurality of robots, optionally operating in parallel during one or more (e.g., all) of their respective iterations of method 300. This may enable more grasp attempts to be achieved in a given time period than if only one robot was operating the method 300. Moreover, in implementations where one or more of the plurality of robots includes an associated vision component with a pose relative to the robot that is unique from the pose of one or more vision components associated with other of the robots, training examples generated based on grasp attempts from the plurality of robots may provide robustness to vision component pose in neural networks trained based on those training examples. Moreover, in implementations where gripping end effectors and/or other hardware components of the plurality of robots vary and/or wear differently, and/or in which different robots (e.g., same make and/or model and/or different make(s) and/or model(s)) interact with different objects (e.g., objects of different sizes, different weights, different shapes, different translucencies, different materials)

and/or in different environments (e.g., different surfaces, different lighting, different environmental obstacles), training examples generated based on grasp attempts from the plurality of robots may provide robustness to various robotic and/or environmental configurations.

In some implementations, the objects that are reachable by a given robot and on which grasp attempts may be made may be different during different iterations of the method 300. For example, a human operator and/or another robot may add and/or remove objects to the workspace of a robot between one or more grasp attempts of the robot. Also, for example, the robot itself may drop one or more objects out of its workspace following successful grasps of those objects. This may increase the diversity of the training data. In some implementations, environmental factors such as lighting, surface(s), obstacles, etc. may additionally and/or alternatively be different during different iterations of the method 300, which may also increase the diversity of the training data.

Figure 4:
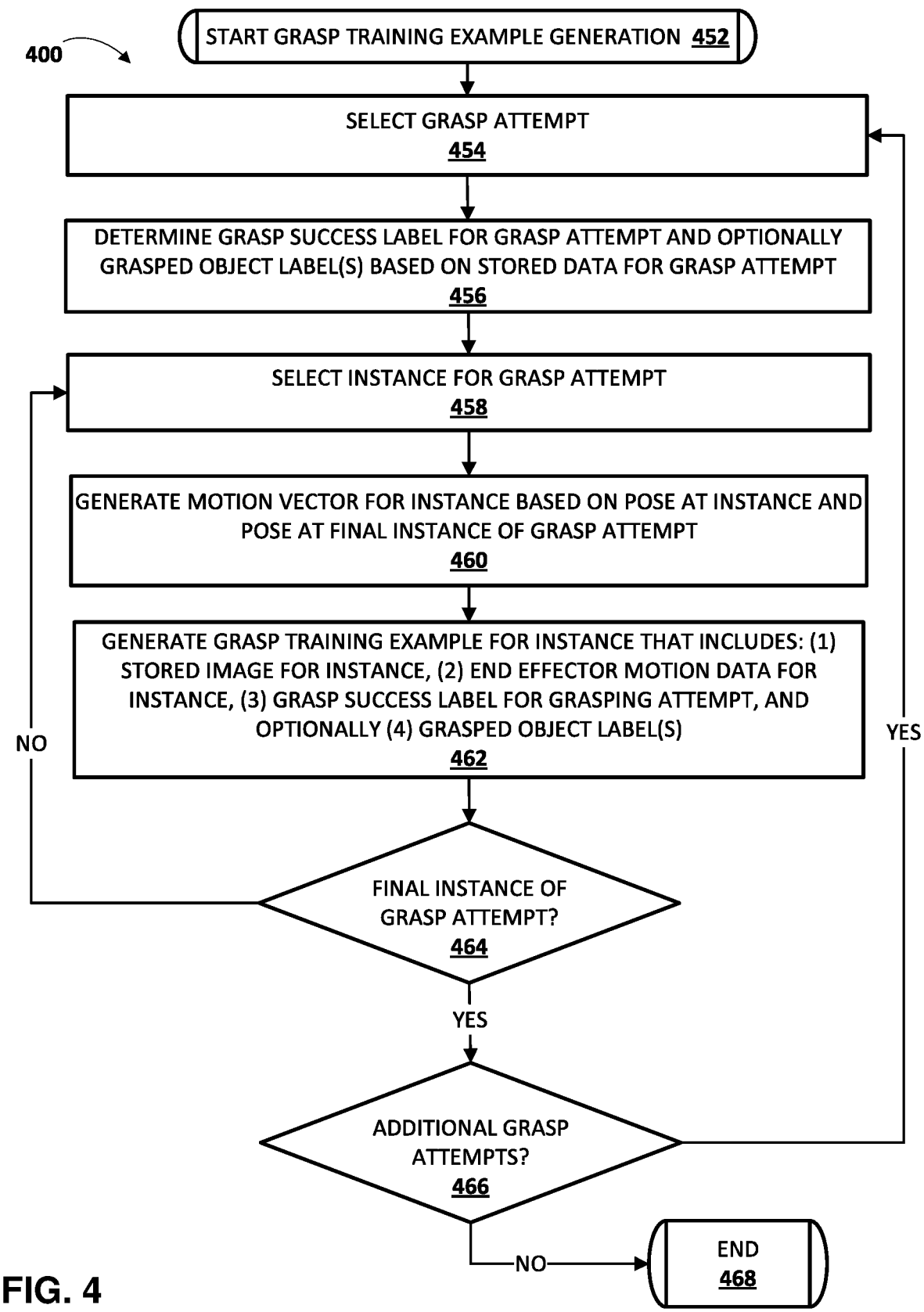
FIG. 4 is a flowchart illustrating an example method of generating semantic grasp training examples based on data associated with grasp attempts of robots.

FIG. 4 is a flowchart illustrating an example method 400 of generating grasp training examples based on data associated with grasp attempts of robots. For convenience, the operations of the flow chart are described with reference to a system that performs the operations. This system may include one or more components of a robot and/or another computer system, such as a processor and/or robot control system of robot 180A, 180B, 1125, and/or a processor of training example generation system 110 and/or other system that may optionally be implemented separate from a robot. Moreover, while operations of method 400 are shown in a particular order, this is not meant to be limiting. One or more operations may be reordered, omitted or added.

At block 452, the system starts training example generation. At block 454, the system selects a grasp attempt. For example, the system may access a database that includes data associated with a plurality of stored grasp attempts, and select one of the stored grasp attempts. The selected grasp attempt may be, for example, a grasp attempt generated based on the method 300 of FIG. 3.

At block 456, the system determines a grasp success label and optionally grasped object label(s) for the selected grasp attempt based on stored data for the selected grasp attempt. For example, as described with respect to block 364 of method 300, additional data may be stored for the grasp attempt to enable determination of a grasp success label and/or grasped object labels for the grasp attempt. The stored data may include data from one or more sensors, where the data is generated during and/or after the grasp attempt.

As one example, the data may be a position reading, a torque reading, and/or other reading from the gripping end effector. In such an example, the system may determine a grasp success label based on the reading(s). For example, where the reading is a position reading, the system may determine a "successful grasp" label if the reading is greater than some threshold (e.g., 1 cm)—and may determine an "unsuccessful grasp" label if the reading is less than some threshold (e.g., 1 cm).

As another example, the data may be an image of the end effector grasping an object grasped in the grasp attempt. For example, the image may be captured by a vision sensor after the end effector and any object that may be grasped by the end effector are moved to a position close to the vision sensor. In such an example, the system may utilize the captured image to determine if the grasp attempt was successful and/or to determine one or more grasped object features of the object grasped by the end effector. For example, the system may provide the captured image to computing devices of one or more human reviewers who may utilize their computing devices to indicate, based on the captured image, whether the grasp was successful and/or to indicate one or more grasped object features of the object being grasped in the captured image. Alternatively, an indication of whether the grasp was successful and/or an indication of one or more grasped object features of the object being grasped in the captured image may be provided in any other suitable manner.

As one example of grasped object labels that may be determined, the grasped object labels may indicate whether the grasped object has each of one or more of a group of classifications. For example, the grasped object labels may indicate the grasped object has a "pen" classification of the group, but does not have any other classifications of the group.

In some iterations of block 456, the system determines only a grasp success label for the grasp attempt. Training examples that include only a grasp success label, and omit (or include a "null" value for) object label(s) are also referred to herein as non-semantic grasp training examples. In some other iterations of block 456, the system additionally determines grasped object label(s) for the grasp attempt. Training examples that include a grasp success label and an object label are also referred to herein as semantic grasp training examples. Whether the system determines, in a given iteration, a grasp success label and/or grasped object label(s) for the grasp attempt may be based on various factors. For example, in some iterations of block 456 only a grasp success label is determined if the grasp of the grasp attempt is unsuccessful. Also, for example, in some iterations of block 456 it may be desirable to generate non-semantic grasp training examples for training only a grasp network (e.g., a separate additional grasp network such as grasp network 125C of FIG. 1C). Also, for example, in some situations computational and/or other costs may be considered in determining if it is desirable to also generate grasp object label(s) for training examples in a given iteration.

At block 458, the system selects an instance for the grasp attempt. For example, the system may select data associated with the instance based on a timestamp and/or other demarcation associated with the data that differentiates it from other instances of the grasp attempt.

At block 460, the system generates an end effector motion vector for the instance based on the pose of the end effector at the instance and the pose of the end effector at the final instance of the grasp attempt. For example, the system may determine a transformation between the current pose and the final pose of the grasp attempt and use the transformation as the end effector motion vector. The current pose and the end effector motion vector from the current pose to the final pose of the grasp attempt may be represented in task-space, in joint-space, or in another space. For example, the end effector motion vector may be represented by five values in task-space: three values defining the three-dimensional (3D) translation vector, and two values representing a sine-cosine encoding of the change in orientation of the end effector about an axis of the end effector.

At block 462, the system generates a grasp training example for the instance that includes: (1) the stored image for the instance, (2) the end effector motion vector generated for the instance at block 460, and (3) the grasp success label and/or the grasped object label(s) determined at block 456. In some implementations, the system generates a grasp training example that also includes a stored additional image for the grasping attempt, such as one that at least partially omits the end effector and that was captured before the grasp attempt. In some of those implementations, the system concatenates the stored image for the instance and the stored additional image for the grasping attempt to generate a concatenated image for the grasp training example. The concatenated image includes both the stored image for the instance and the stored additional image. For example, where both images include X by Y pixels and three channels (e.g., red, blue, green), the concatenated image may include X by Y pixels and six channels (three from each image). As described herein, the current image, the additional image, and the vector from the current pose to the final pose of the grasp attempt of the training examples may be utilized as training example input(s); and the grasp success label and/or the grasped object label(s) may be utilized as training example output(s).

In some implementations, at block 462 the system may optionally process the image(s). For example, the system may optionally resize the image to fit a defined size of an input layer of one or more networks, remove one or more channels from the image, and/or normalize the values for depth channel(s) (in implementations where the images include a depth channel).

At block 464, the system determines whether the selected instance is the final instance of the grasp attempt. If the system determines the selected instance is not the final instance of the grasp attempt, the system returns to block 458 and selects another instance.

If the system determines the selected instance is the final instance of the grasp attempt, the system proceeds to block 466 and determines whether there are additional grasp attempts to process. If the system determines there are additional grasp attempts to process, the system returns to block 454 and selects another grasp attempt. In some implementations, determining whether there are additional grasp attempts to process may include determining whether there are any remaining unprocessed grasp attempts. In some implementations, determining whether there are additional grasp attempts to process may additionally and/or alternatively include determining whether a threshold number of training examples has already been generated and/or other criteria has been satisfied.

If the system determines there are not additional grasp attempts to process, the system proceeds to block 468 and the method 400 ends. Another iteration of method 400 may be performed again. For example, the method 400 may be performed again in response to at least a threshold number of additional grasp attempts being performed.

Although method 300 and method 400 are illustrated in separate figures herein for the sake of clarity, it is understood that one or more blocks of method 400 may be performed by the same component(s) that perform one or more blocks of the method 300. For example, one or more (e.g., all) of the blocks of method 300 and the method 400 may be performed by processor(s) of a robot. Also, it is understood that one or more blocks of method 400 may be performed in combination with, or preceding or following, one or more blocks of method 300.

Figure 5:
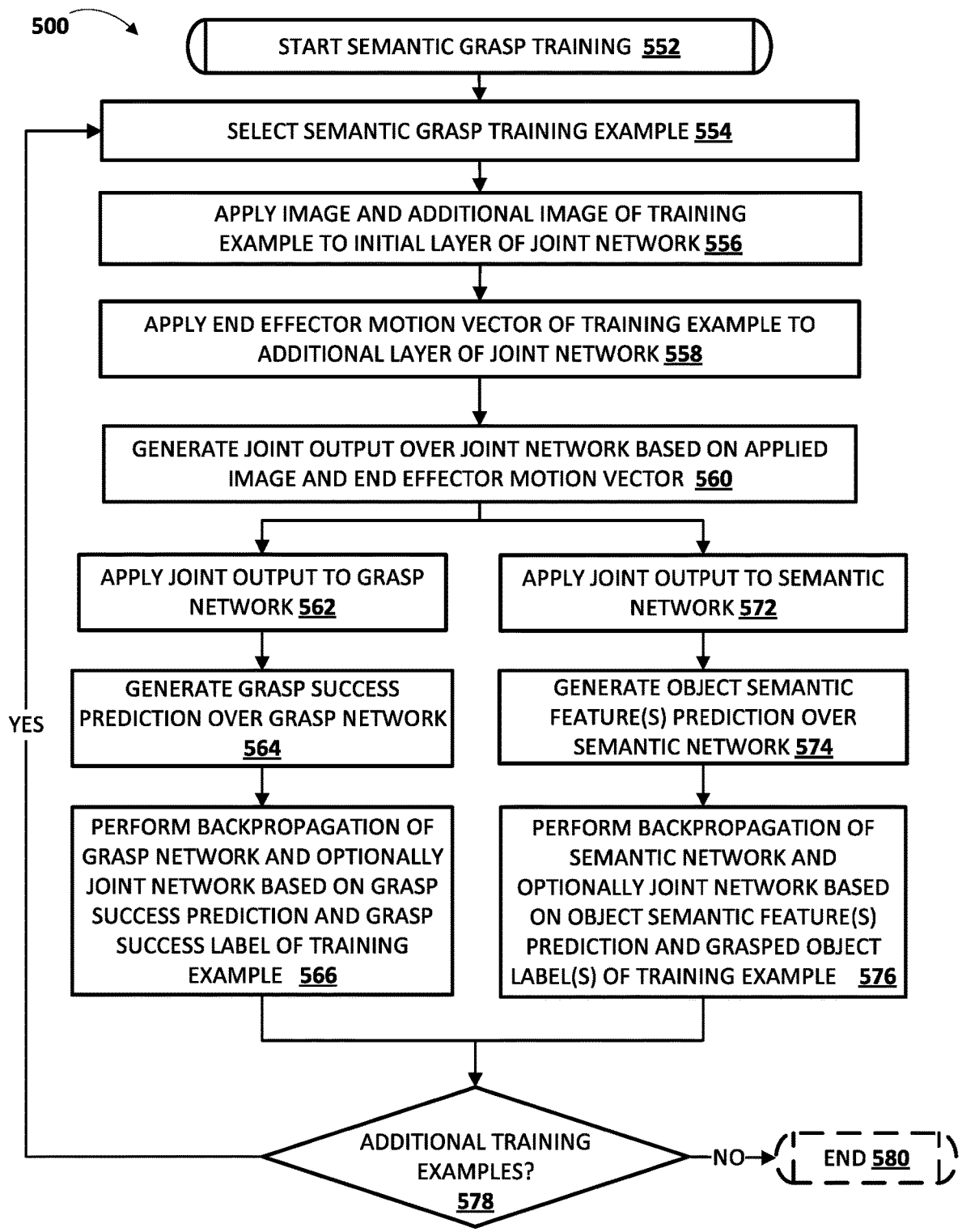
FIG. 5 is a flow chart illustrating an example method of training networks of a semantic grasping model based on semantic grasp training examples.
Figure 6:
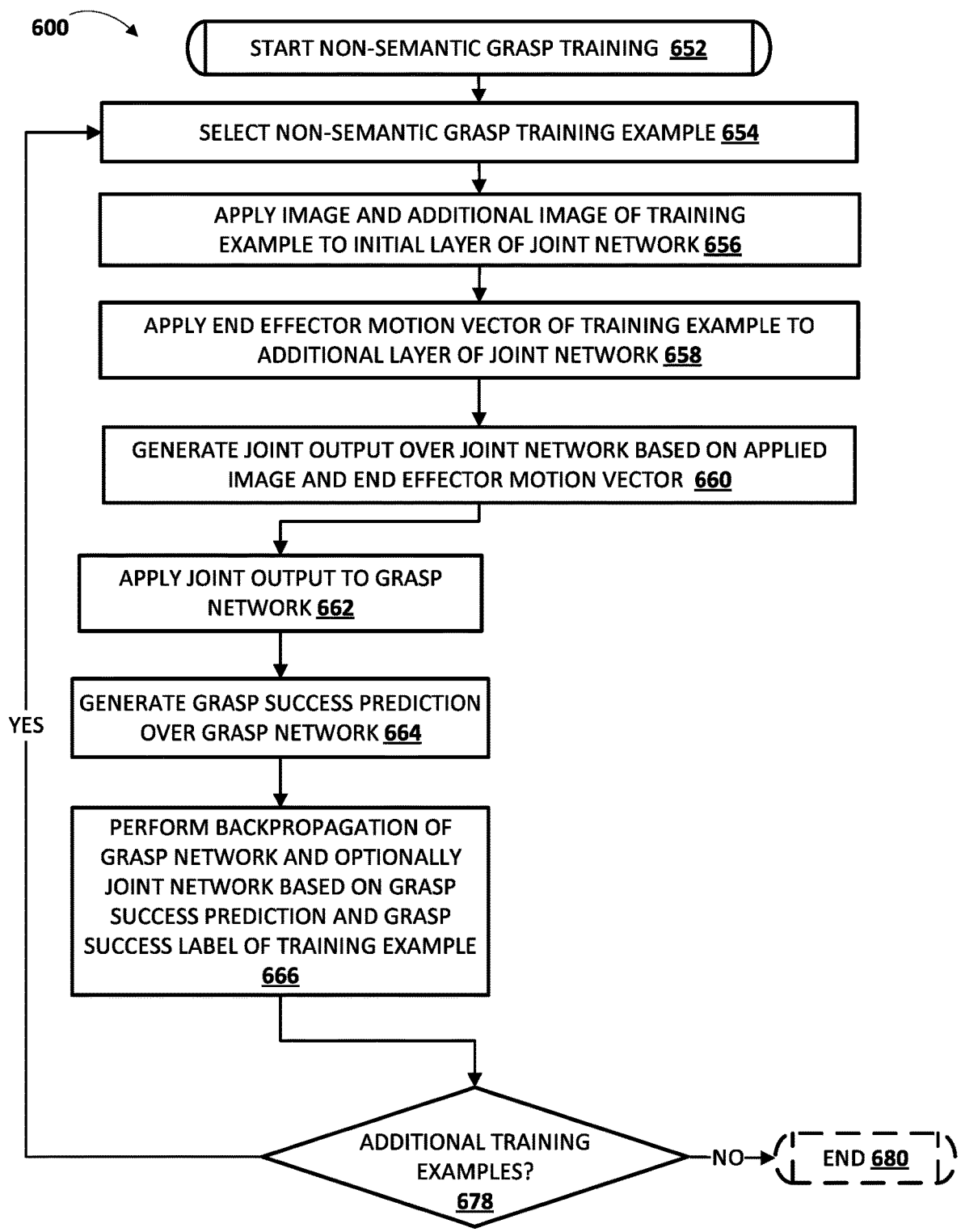
FIG. 6 is a flow chart illustrating an example method of training a grasp model and a joint network based on non-semantic grasp training examples.
Figure 7:
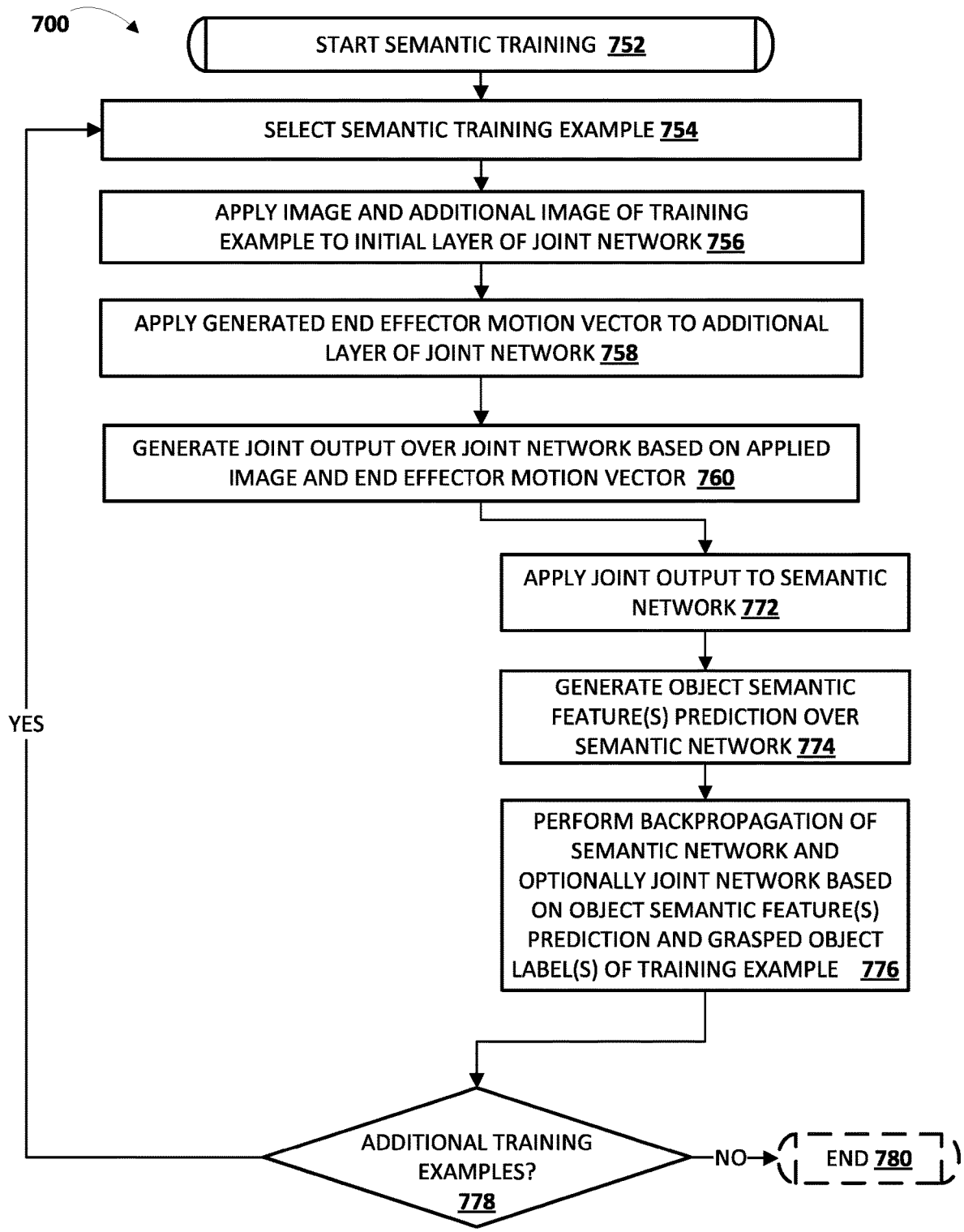
FIG. 7 is a flow chart illustrating an example method of training a semantic model and a joint network based on semantic training examples.

Turning now to FIGS. 5-7, various example methods of training networks of a semantic grasping model are described. For ease in explanation, the example methods will be described with respect to semantic grasping model 124B of FIG. 1B, and its constituent components 125B, 126B, and 127B.

FIG. 5 is a flowchart illustrating an example method 500 of training networks of a semantic grasping model based on semantic grasp training examples. For convenience, the operations of the flow chart are described with reference to a system that performs the operations. This system may include one or more components of a computer system, such as one or more processors (e.g., GPU(s) and/or TPU(s)) of training engine 120 and/or other computer system operating over the networks of a semantic grasping model. Moreover, while operations of method 500 are shown in a particular order, this is not meant to be limiting. One or more operations may be reordered, omitted or added.

At block 552, the system starts semantic grasp training. At block 554, the system selects a semantic grasp training example. For example, the system may select a semantic grasp training example generated based on the method 400 of FIG. 4.

At block 556, the system applies an image for the instance of the training example and an additional image of the selected training example to an initial layer of a joint network. For example, the system may apply the images to an initial convolutional layer of the joint network 126B of FIG. 1B. As described herein, the additional image may at least partially omit the end effector. In some implementations, the system concatenates the image and the additional image and applies the concatenated image to the initial layer. In some other implementations, the image and the additional image are already concatenated in the training example.

At block 558, the system applies the end effector motion vector of the selected training example to an additional layer of the joint network. For example, the system may apply the end effector motion vector to an additional layer of the joint network 126B that is downstream of the initial layer to which the images are applied at block 556. In some implementations, to apply the end effector motion vector to the additional layer, the system passes the end effector motion vector through one or more fully connected layers to generate end effector motion vector output, and concatenates the end effector motion vector output with output from an immediately upstream layer of the joint network 126B. The immediately upstream layer is immediately upstream of the additional layer to which the end effector motion vector is applied and may optionally be one or more layers downstream from the initial layer to which the images are applied at block 556. In some implementations, the initial layer is a convolutional layer, the immediately upstream layer is a pooling layer, and the additional layer is a convolutional layer.

At block 560, the system generates joint output over the joint network based on the applied image and the applied end effector motion vector. For example, the system can generate joint output over the joint network 126B of FIG. 1B based on the current learned parameters of the joint network 126B.

At block 562, the system applies the joint output generated at block 560 to a grasp network. For example, the system can apply the joint output to the grasp network 125B of FIG. 1B.

At block 564, the system generates a grasp success prediction over the grasp network based on the applied joint output. For example, the system can generate a grasp success prediction over the grasp network 125B based on the current learned parameters of the grasp network 125B.

At block 566, the system performs backpropagation on the grasp network, and optionally on the joint network, based on the grasp success prediction of block 564 and based on the grasp success label of the training example. For example, the system may generate a loss based on comparison of the grasp success prediction to the grasp success label of the training example, and backpropagate the loss through the grasp network 125B and through the joint network 126B. For instance, the loss can be applied to the grasp network 125B, parameters of the grasp network 125B updated based on the loss, and a calculated remaining loss can be further applied to the joint network 126B and parameters of the joint network 126B updated based on the remaining loss. In some implementations, the grasp success prediction is a probability measure (e.g., from 0 to 1) and the grasp success label is also a probability measure (e.g., either 0 or 1), and the loss is a binary loss (e.g., based on the magnitude of the difference between the grasp success prediction and the grasp success label).

At block 572, the system also applies the joint output generated at block 560 to a semantic network. For example, the system can apply the joint output to the semantic network 127B of FIG. 1B.

At block 574, the system generates an object semantic feature(s) prediction over the semantic network based on the applied joint output. For example, the system can generate a object semantic feature(s) prediction over the semantic network 127B based on the current learned parameters of the semantic network 127B.

At block 576, the system performs backpropagation on the semantic network, and optionally on the joint network, based on the grasped semantic feature(s) prediction of block 574 and based on the grasped object label(s) of the training example. For example, the system may generate a loss based on comparison of the object semantic feature(s) prediction to the grasped object label(s) of the training example, and backpropagate the loss through the semantic network 127B and through the joint network 126B. For instance, the loss can be applied to the semantic network 127B, parameters of the semantic network 127B updated based on the loss, and a calculated remaining loss can be further applied to the joint network 126B and parameters of the joint network 126B updated based on the remaining loss. In some implementations, the object semantic feature(s) prediction is a probability measure for each of a plurality of classes (and/or other semantic feature(s)), and the grasped object label(s) are also probability measures for each of the classes (e.g., either 0 or 1), and the loss is a cross-entropy loss (e.g., based on the magnitude of the difference between the grasp success prediction and the grasp success label).

It is noted that, at block 566, the system does not update the semantic network based on a "grasp" loss determined based on the grasp prediction of block 564 and based on the grasp success label of the training example. Similarly, it is noted that, at block 576, the system does not update the grasp network based on a "semantic" loss determined based on the semantic feature(s) prediction of block 574 and the grasped object label(s). In this manner, the semantic network and the grasp network can be trained end to end, but trained independently of one another. Moreover, in many implementations, the joint network is trained based on losses determined based on both the "grasp" loss and the "semantic" loss.

At block 578, the system determines whether there are additional semantic grasp training examples. If the system determines there are additional semantic grasp training examples, the system returns to block 554 and selects another semantic grasp training example. In some implementations, determining whether there are additional semantic grasp training examples may include determining whether there are any remaining semantic grasp training examples that have not been utilized to train one or more networks of the semantic grasping model. In some implementations, determining whether there are additional semantic grasp training examples may additionally and/or alternatively include determining whether a threshold number of semantic grasp training examples have been utilized and/or other criteria has been satisfied.

If the system determines there are not additional semantic grasp training examples and/or that some other criteria has been met, the system proceeds to block 580, where the training of the semantic grasping model based on the semantic training examples may end (at least temporarily). It is noted that in implementations where the method of FIG. 6 and/or the method of FIG. 7 (described below) are additionally utilized to train network(s) of the semantic grasping model, one or more iterations of FIG. 5 may be performed before or after one or more iterations of FIG. 6 and/or FIG. 7. As one example, the semantic grasping model may be trained via multiple iterations of FIG. 5, then trained via multiple iterations of FIG. 6 and/or FIG. 7, then trained via multiple additional iterations of FIG. 5.

FIG. 6 is a flow chart illustrating an example method 600 of training a grasp model and a joint network of a semantic grasping model, based on non-semantic grasp training examples. For convenience, the operations of the flow chart are described with reference to a system that performs the operations. This system may include one or more components of a computer system, such as one or more processors (e.g., GPU(s) and/or TPU(s)) of training engine 120 and/or other computer system operating over the networks of a semantic grasping model. Moreover, while operations of method 600 are shown in a particular order, this is not meant to be limiting. One or more operations may be reordered, omitted or added.

At block 652, the system starts non-semantic grasp training. At block 654, the system selects a non-semantic grasp training example. For example, the system may select a non-semantic grasp training example generated based on the method 400 of FIG. 4. As described, a non-semantic grasp training example can lack (or include a "null" value for) any grasped object label(s) in training example output.

At block 656, the system applies an image for the selected training example and an additional image of the selected training example to an initial layer of a joint network. For example, the system may apply the images to an initial convolutional layer of the joint network 126B of FIG. 1B.

At block 658, the system applies the end effector motion vector of the selected training example to an additional layer of the joint network. For example, the system may apply the end effector motion vector to an additional layer of the joint network 126B that is downstream of the initial layer to which the images are applied at block 656.

At block 660, the system generates joint output over the joint network based on the applied image and the applied end effector motion vector. For example, the system can generate joint output over the joint network 126B of FIG. 1B based on the current learned parameters of the joint network 126B.

At block 662, the system applies the joint output generated at block 660 to a grasp network. For example, the system can apply the joint output to the grasp network 125B of FIG. 1B.

At block 664, the system generates a grasp success prediction over the grasp network based on the applied joint output. For example, the system can generate a grasp success prediction over the grasp network 125B based on the current learned parameters of the grasp network 125B.

At block 666, the system performs backpropagation on the grasp network, and optionally on the joint network, based on the grasp success prediction of block 664 and based on the grasp success label of the training example. For example, the system may generate a loss based on comparison of the grasp success prediction to the grasp success label of the training example, and backpropagate the loss through the grasp network 125B and through the joint network 126B. For instance, the loss can be applied to the grasp network 125B, parameters of the grasp network 125B updated based on the loss, and a calculated remaining loss can be further applied to the joint network 126B and parameters of the joint network 126B updated based on the remaining loss.

It is noted that in method 600, the joint output is not applied to a semantic network and a "semantic" loss isn't generated for updating the semantic network and/or the joint network. This is due to the non-semantic grasp training examples lacking an object label in the training example output.

At block 678, the system determines whether there are additional non-semantic grasp training examples. If the system determines there are additional non-semantic grasp training examples, the system returns to block 654 and selects another non-semantic grasp training example. In some implementations, determining whether there are additional non-semantic grasp training examples may include determining whether there are any remaining non-semantic grasp training examples that have not been utilized to train one or more networks of the semantic grasping model. In some implementations, determining whether there are additional non-semantic grasp training examples may additionally and/or alternatively include determining whether a threshold number of non-semantic grasp training examples have been utilized and/or other criteria has been satisfied.

If the system determines there are not additional non-semantic grasp training examples and/or that some other criteria has been met, the system proceeds to block 680, where the training of the semantic grasping model based on the non-semantic grasp training examples may end (at least temporarily).

FIG. 7 is a flow chart illustrating an example method of training a semantic model and a joint network based on semantic training examples. For convenience, the operations of the flow chart are described with reference to a system that performs the operations. This system may include one or more components of a computer system, such as one or more processors (e.g., GPU(s) and/or TPU(s)) of training engine 120 and/or other computer system operating over the networks of a semantic grasping model. Moreover, while operations of method 700 are shown in a particular order, this is not meant to be limiting. One or more operations may be reordered, omitted or added.

At block 752, the system starts semantic training. At block 754, the system selects a semantic (non-grasp) training example. As described, semantic training examples can each be of the same format as the semantic grasp training examples, except that they omit the grasp success label (or contain a "null" value for the grasp success label). In other words, they do not include training example output that indicates whether a grasp was successful. In some implementations, the semantic training examples can include auxiliary data in the form of training examples from an image classification (or other feature(s)) dataset, appended with a random, pseudo-random, or otherwise generated motion vector as additional training example input (in addition to the image(s)). The "grasped object label" of such a training example can be the classification (or other feature (s)) assigned to the image in the dataset.

At block 756, the system applies an image for the selected training example and an additional image of the selected training example to an initial layer of a joint network. For example, the system may apply the images to an initial convolutional layer of the joint network 126B of FIG. 1B.

At block 758, the system applies the end effector motion vector of the selected training example to an additional layer of the joint network. For example, the system may apply the end effector motion vector to an additional layer of the joint network 126B that is downstream of the initial layer to which the images are applied at block 756.

At block 760, the system generates joint output over the joint network based on the applied image and the applied end effector motion vector. For example, the system can generate joint output over the joint network 126B of FIG. 1B based on the current learned parameters of the joint network 126B.

At block 772, the system applies the joint output generated at block 760 to a semantic network. For example, the system can apply the joint output to the semantic network 127B of FIG. 1B.

At block 774, the system generates an object semantic feature(s) prediction over the semantic network based on the applied joint output. For example, the system can generate a grasped object label(s) prediction over the semantic network 127B based on the current learned parameters of the semantic network 127B.

At block 776, the system performs backpropagation on the semantic network, and optionally on the joint network, based on the object semantic feature(s) prediction of block 774 and based on the grasped object label(s) of the training example. For example, the system may generate a loss based on comparison of the object semantic feature(s) prediction to the grasped object label(s) of the training example, and backpropagate the loss through the semantic network 127B and through the joint network 126B. For instance, the loss can be applied to the semantic network 127B, parameters of the semantic network 127B updated based on the loss, and a calculated remaining loss can be further applied to the joint network 126B and parameters of the joint network 126B updated based on the remaining loss.

It is noted that in method 700, the joint output is not applied to a grasp network and a "grasp" loss isn't generated for updating the grasp network and/or the joint network. This is due to the semantic training examples lacking a grasp success label in the training example output.

At block 778, the system determines whether there are additional semantic training examples. If the system determines there are additional semantic training examples, the system returns to block 754 and selects another semantic training example. In some implementations, determining whether there are additional semantic training examples may include determining whether there are any remaining semantic training examples that have not been utilized to train one or more networks of the semantic grasping model. In some implementations, determining whether there are additional semantic training examples may additionally and/or alternatively include determining whether a threshold number of semantic training examples have been utilized and/or other criteria has been satisfied.

If the system determines there are not additional semantic training examples and/or that some other criteria has been met, the system proceeds to block 780, where the training of the semantic grasping model based on the semantic training examples may end (at least temporarily).

Figure 8A:
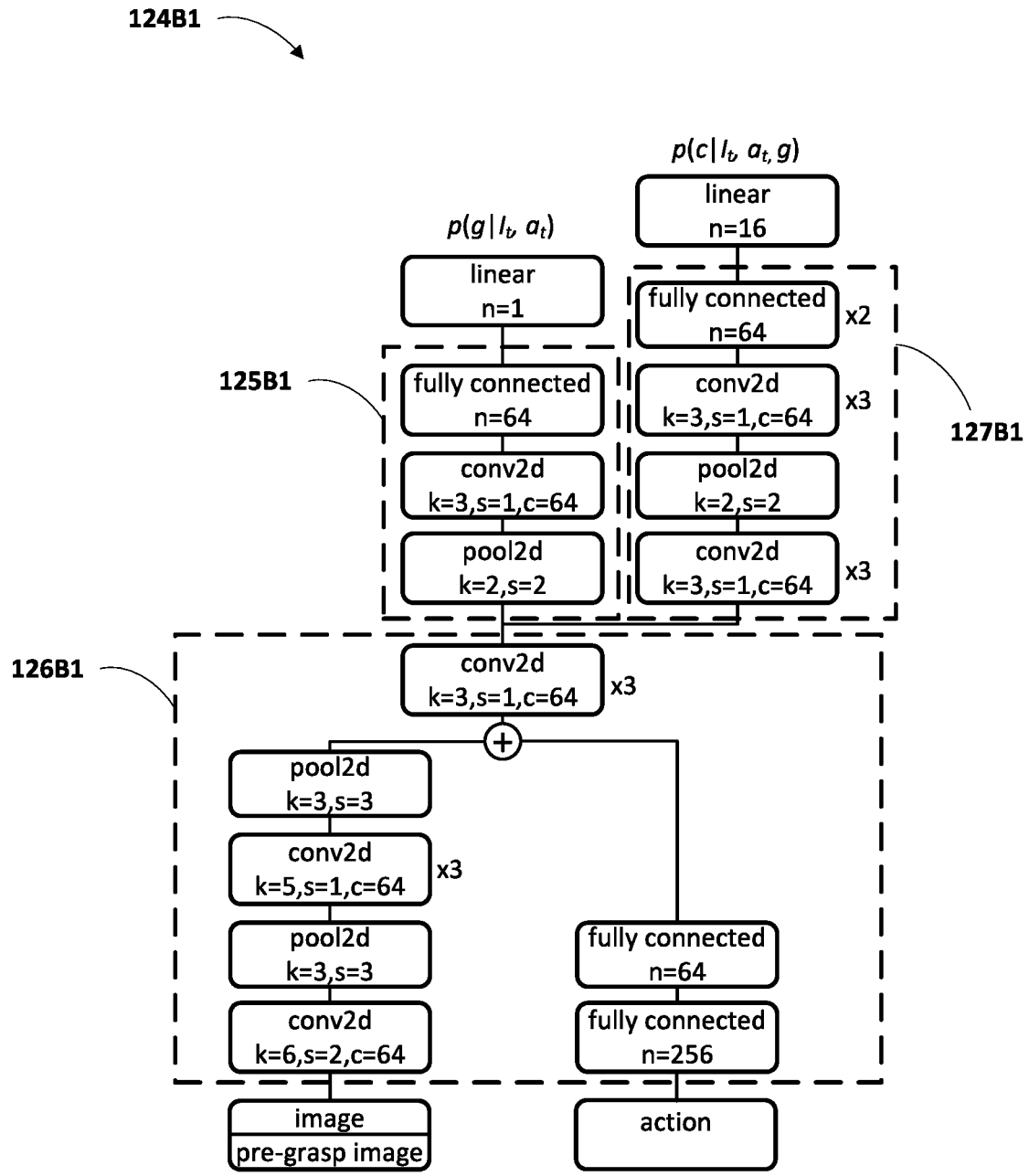
FIG. 8A illustrates an example architecture of the implementation of the semantic grasping model of FIG. 1B.

FIG. 8A illustrates an example architecture of the implementation of the semantic grasping model 125A of FIG. 1B. The networks 125B, 126B, and 127B of FIG. 1B are referenced in FIG. 8A appended with "1", to indicate that they are one example of the implementation of FIG. 1B. The joint network 126B1 of FIG. 8A includes convolutional and pooling layers that process the images, and includes fully connected layers that process the end effector motion vector (referenced as the "action" in FIG. 8A). Output from the processing of the images and output from the processing of the action are concatenated (as indicated by the "+" node) and applied to three additional convolutional layers of the joint network 126B1. The output from those three additional layers is applied to the grasp network 125B1 and is applied to the semantic network 127B1. The grasp network 125B1 and the semantic network 127B1 each include a pooling layer, convolutional layer(s), and a fully connected layer. The grasp network 125B1 generates a grasp success prediction based on processing of the joint output, as indicated by $p(g|I\_t,a\_t)$ and "linear n-1". The semantic network 127B1 generates a semantic features prediction as indicated by $p(c|I\_t,a\_t\ g)$ and "linear n=16" (in this the semantic features prediction indicates whether each of 16 separate classes (or other feature(s)) is present absent.

Figure 8B:
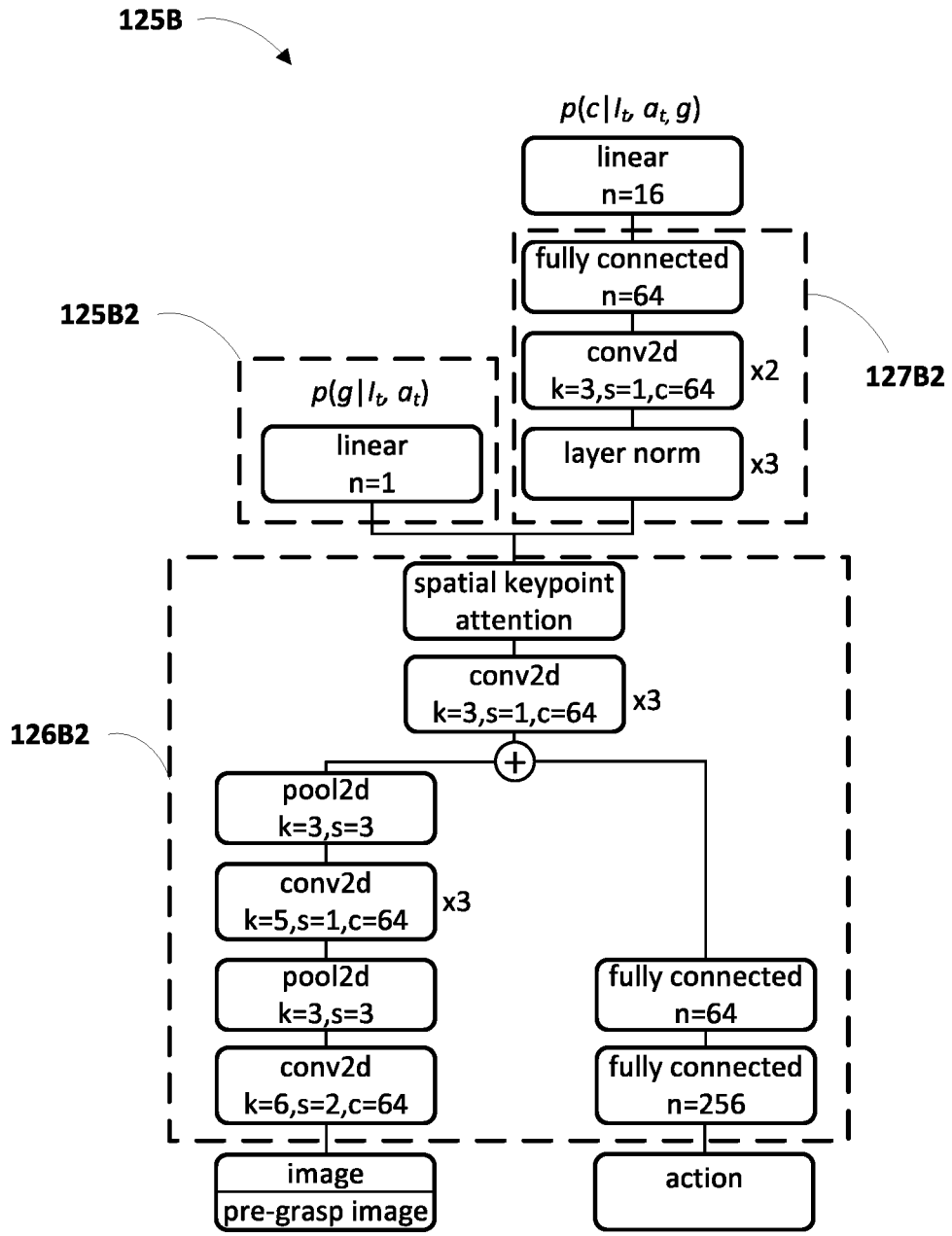
FIG. 8B illustrates another example architecture of the implementation of the semantic grasping model of FIG. 1B.

FIG. 8B illustrates another example architecture of the implementation of the semantic grasping model 125B of FIG. 1B. The networks 125B, 126B, and 127B of FIG. 1B are referenced appended with "2" in FIG. 8B, to indicate that they are another example of the implementation of FIG. 1B. The joint network 126B2 of FIG. 8B is similar to that of the joint network 126B1 of FIG. 8A. However, it includes a spatial keypoint attention layer as a last layer. As described herein, in some implementations spatial keypoint attention can enable downstream networks to have fewer parameters without significantly impacting learning. As a result, semantic network 127B2 includes fewer layers than the semantic network 127B1 of FIG. 8A. Moreover, grasp network 125B2 is illustrated as having no layers, but instead determining the grasp success measure directly based on the joint output. However, in other implementations grasp network 125B2 may include one or more neural network layers, such as one or more fully connected layers.

Figure 8C:
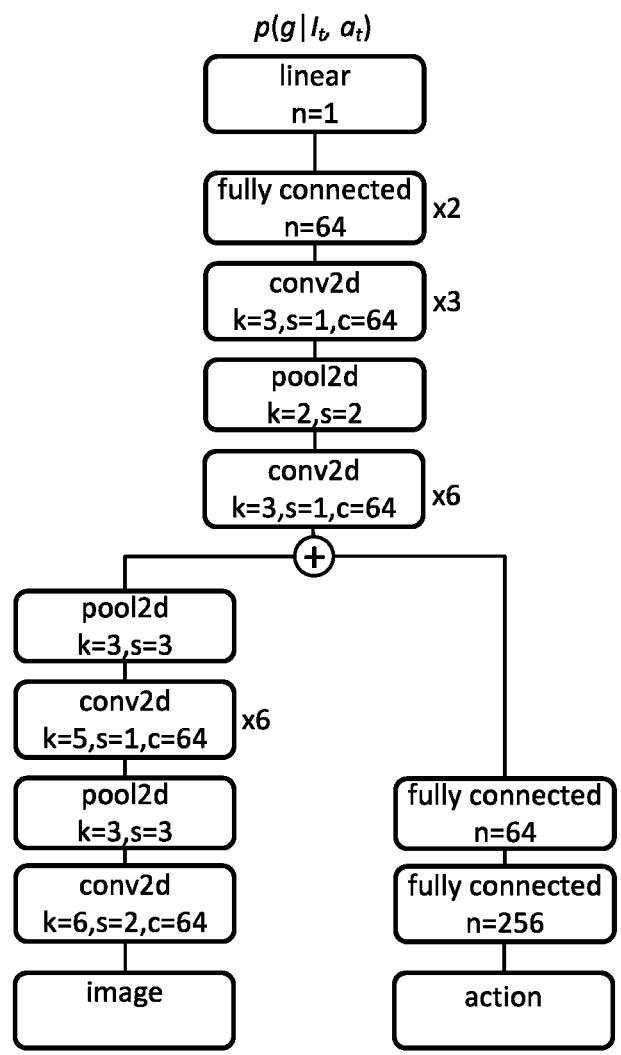
FIG. 8C illustrates an example architecture of the implementation of the grasp network of FIG. 1C.

FIG. 8C illustrates an example architecture of the implementation of the grasp network 125C of FIG. 1C. The grasp network 125C of FIG. 8C operates on input image(s) and end effector motion vector (indicated as "action" in FIG. 8C) to generate a grasp success prediction as indicated by $p(g|I_t, a_t)$ and "linear n-1". As described herein, the grasp network 125C can be an "additional" grasp network trained independently. For example, the grasp network 125C can be trained based on grasp training examples generated according to the method 400—and can be trained without reference to any grasped object labels/semantic features.

Figure 9:
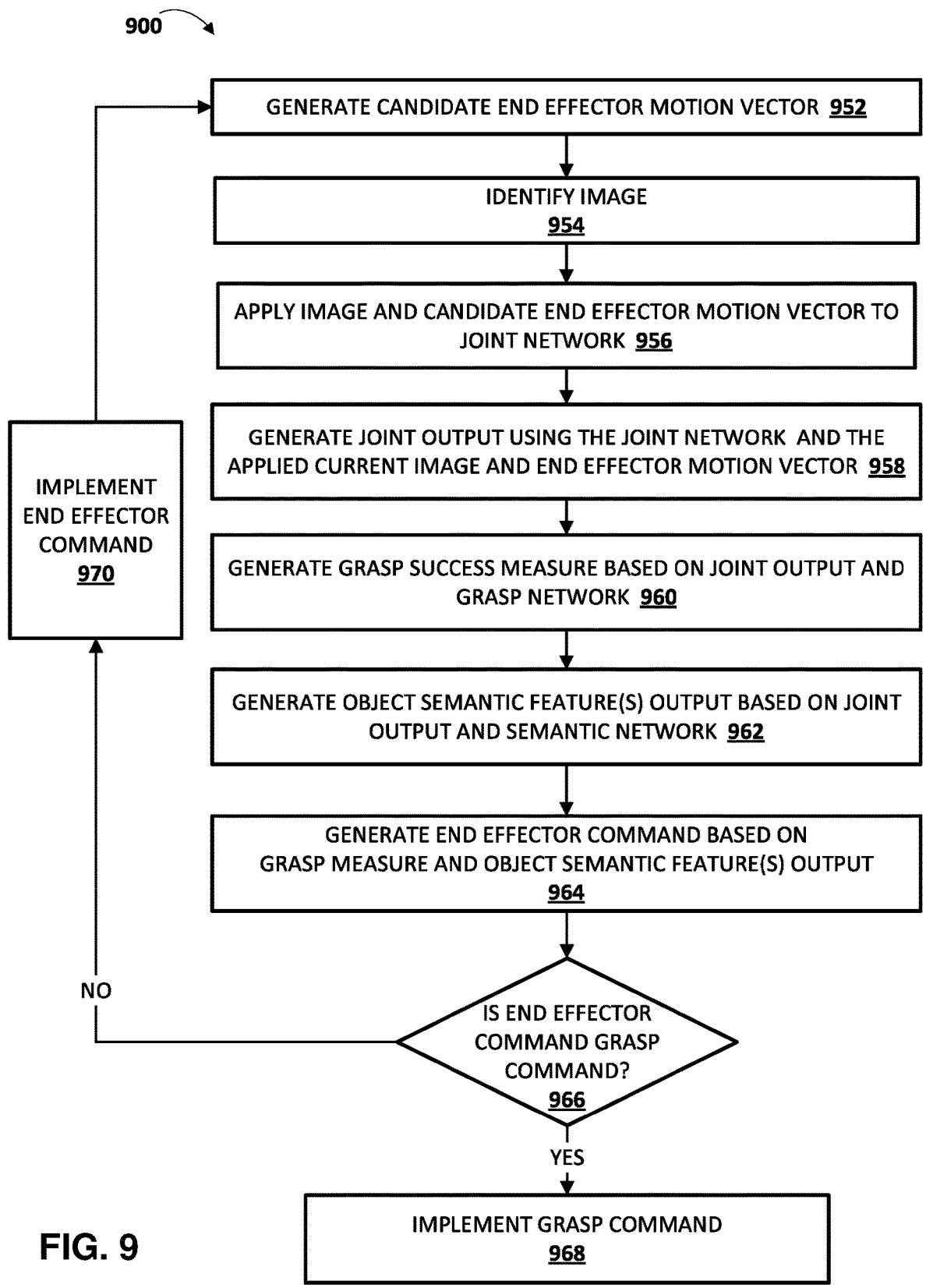
FIG. 9 is a flowchart illustrating an example method of utilizing a semantic grasping model to servo a grasping end effector.
Figure 10:
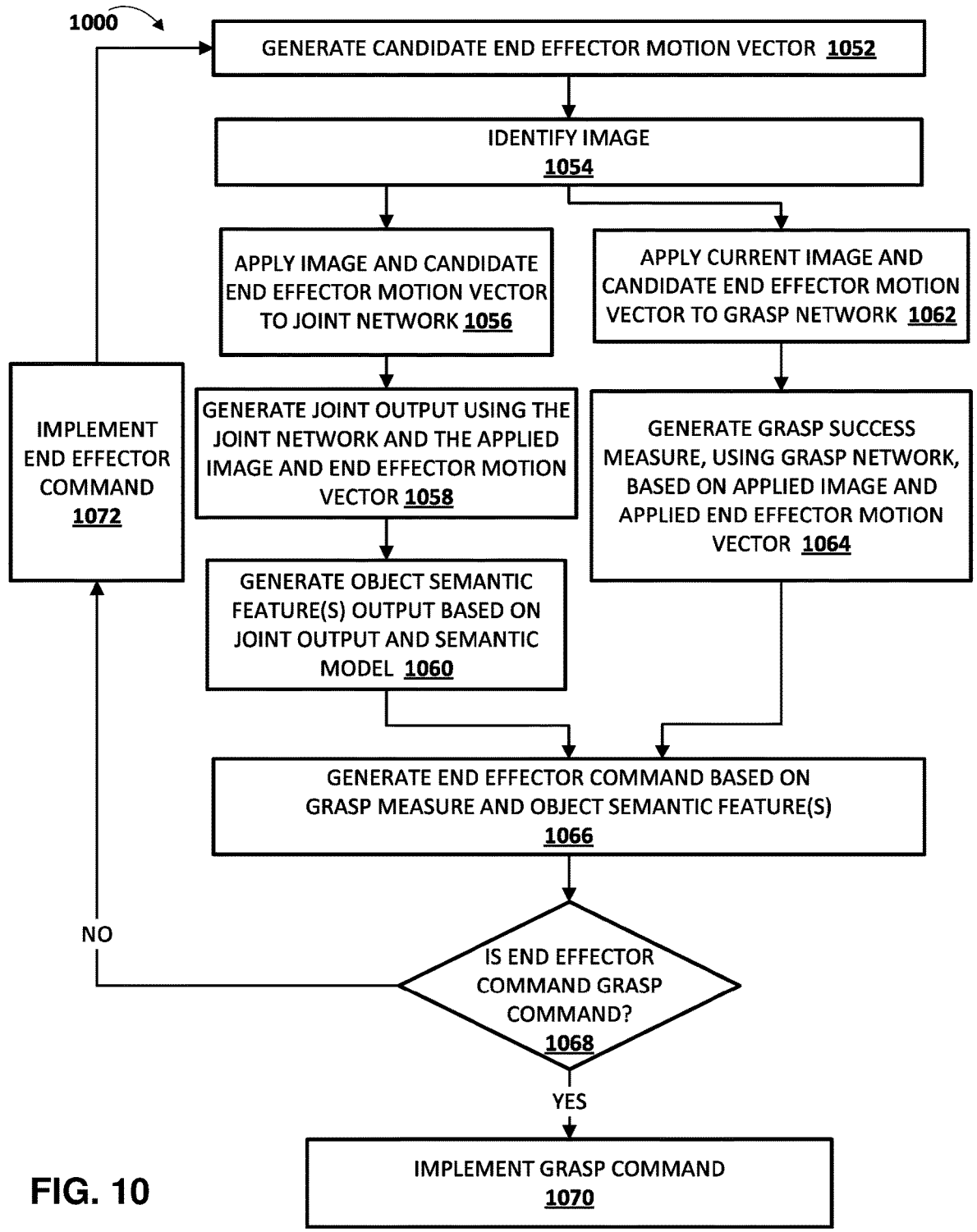
FIG. 10 is a flowchart illustrating another example method of utilizing a semantic grasping model to servo a grasping end effector.

Once a semantic grasping model is trained according to techniques described herein, it may be utilized to servo a grasping end effector. Two examples are given with reference to FIGS. 9 and 10. FIG. 9 is an example of servoing a grasping end effector utilizing a two-branch semantic grasping model, such as model 124B of FIG. 1B—and is described with reference to model 124B. FIG. 10 is an example of servoing a grasping end effector utilizing a semantic grasping model with a separately trained additional grasp network, such as model 124C of FIG. 1C—and is described with reference to model 124C.

FIG. 9 is a flowchart illustrating an example method 900 of utilizing a semantic grasping model to servo a grasping end effector. For convenience, the operations of the flow chart are described with reference to a system that performs the operations. This system may include one or more components of a robot, such as a processor (e.g., CPU and/or GPU) and/or robot control system of robot 180A, 180B, 1125, and/or other robot. In implementing one or more blocks of method 900, the system may operate using a trained semantic grasping model which may, for example, be stored locally at a robot and/or may be stored remote from the robot. Moreover, while operations of method 900 are shown in a particular order, this is not meant to be limiting. One or more operations may be reordered, omitted or added.

At block 952, the system generates a candidate end effector motion vector. The candidate end effector motion vector may be defined in task-space, joint-space, or other space, depending on the input parameters of the trained semantic grasping model to be utilized in further blocks.

In some implementations, the system generates a candidate end effector motion vector that is random within a given space, such as the work-space reachable by the end effector, a restricted space within which the end effector is confined for the grasp attempts, and/or a space defined by position and/or torque limits of actuator(s) that control the pose of the end effector.

In some implementations the system may utilize one or more techniques to sample a group of candidate end effector motion vectors and to select a subgroup from the sampled group. For example, the system may utilize an optimization technique, such as the cross-entropy method (CEM). CEM is a derivative-free optimization algorithm that samples a batch of N values at each iteration, fits a Gaussian distribution to M<N of these samples, and then samples a new batch of N from this Gaussian. For instance, the system may utilize CEM and values of M=64 and N=6, and perform three iterations of CEM to determine a best available (according to the CEM) candidate end effector motion vector. In some implementations where a group of candidate end effector motion vectors are sampled, multiple loops of blocks 952, 954, 956, 958, and 960 can be performed (serially or in parallel) in an iteration of method 900. At each loop, a different sampled candidate end effector motion vector is utilized at block 952 (e.g., it is generated using the optimization technique). Accordingly, at each loop a different grasp success measure is generated at block 960 that is particularized to the sampled candidate end effector motion vector for that loop. The grasp success measures can be utilized to determine the best available (from the sampled) candidate end effector motion vector (e.g., the sampled candidate end effector motion vector with the grasp success measure most indicative of grasp success), and that best available candidate end effector motion vector utilized at blocks 964, 966, and optionally 970. In these and other manners, multiple candidate end effector motion vectors can be considered in each iteration of method 900.

In some implementations, one or more constraints may be imposed on the candidate end effector motion vector that can be generated at block 952. For example, the candidate end effector motions evaluated by CEM or other technique may be constrained based on the constraints. One example of constraints are computer generated and/or human (or user) inputted constraints (e.g., via a user interface input device of a computer system) that imposes constraints on area(s) in which grasps may be attempted, constraints on particular object feature(s) on which grasps may be attempted, etc. Yet other examples of constraints include, for example, constraints based on a workspace of the robot, joint limits of the robot, torque limits of the robot, constraints provided by a collision avoidance system and that restrict the movement of the robot to prevent collision with one or more objects, etc.

At block 954, the system identifies an image that captures the end effector and one or more environmental objects. In some implementations, the system also identifies an additional image that at least partially omits the end effector, such as an additional image of the environmental objects that was captured by a vision sensor when the end effector was at least partially out of view of the vision sensor. In some implementations, the system concatenates the image and the additional image to generate a concatenated image. In some implementations, the system optionally performs processing of the image(s) and/or concatenated image.

At block 956, the system applies the image and the candidate end effector motion vector to a trained joint network. For example, the system may apply the concatenated image, that includes the current image and the additional image, to an initial layer of the trained joint network 126B of FIG. 1B. The system may also apply the candidate end effector motion vector to an additional layer of the trained joint network 126B that is downstream of the initial layer. In some implementations, in applying the candidate end effector motion vector to the additional layer, the system passes the end effector motion vector through a fully connected layer of the trained joint network 126B to generate end effector motion vector output and concatenates the end effector motion vector output with upstream output of the trained joint network 126B. The upstream output is from an immediately upstream layer of the trained joint network 126B that is immediately upstream of the additional layer and that is downstream from the initial layer and from one or more intermediary layers of the trained joint network 126B.

At block 958, the system generates joint output using the joint network and the applied current image and the applied end effector motion vector. For example, the system can process the applied current image and the applied end effector motion vector using the trained parameters of the trained joint network 126B, to generate the joint output.

At block 960, the system generates a grasp success measure based on the joint output generated at block 958, and based on a trained grasp network. For example, the system can generate the grasp success prediction based on processing the joint output using the trained parameters of the trained grasp network 125B.

At block 962, the system generates output that indicates object semantic feature(s). The system generates the output based on the joint output generated at block 958, and based on a trained semantic network. For example, the system can generate the semantic feature(s) based on processing the joint output using the trained parameters of the trained semantic network 127B.

At block 964, the system generates an end effector command based on the grasp success measure of block 960 and the object semantic feature(s) indicated by the output of block 962. Generally, at block 964, the system generates an end effector command that seeks to achieve (through one or more iterations of method 900) a successful grasp that is of an object that has desired object semantic features. The desired object semantic features may be based on, for example, user interface input provided to the system and/or input from one or more separate components. As one example, if the grasp success measure of block 960 satisfies a threshold that indicates a successful grasp and the semantic feature(s) indicated in the output of block 962 indicate the object likely has the desired object semantic feature(s), the end effector command may generate an end effector command that corresponds to the end effector motion vector of block 952 (then a grasp optionally performed).

As mentioned above, in some implementations multiple candidate end effector motion vectors are considered in one or more iterations of method 900 and a grasp success measure (and optionally semantic feature(s)) determined for each of the candidate end effector motion vectors (all based on the same current image). In some of those implementations, at block 964 the system determines the end effector motion vector with a determined grasp success measure that is most indicative of success (and optionally with determined corresponding object semantic feature(s) that conform to the desired object semantic feature(s)), and generates an end effector command that corresponds to that end effector motion vector.

As one example of those implementations, the system may generate one or more additional candidate end effector motion vectors at block 952, and generate: grasp success measures for those additional candidate end effector motion vectors at additional iterations of block 960 (based on applying joint outputs from the joint network to the grasp network, where the joint outputs are based on the current image and the additional candidate end effector motion vectors); and object semantic feature(s) output for those additional candidate end effector motion vectors at additional iterations of block 962 (based on applying the joint output to the semantic network). The additional iterations may optionally be performed in parallel by the system. In some of those implementations, the system may generate the end effector command at block 964 based on analysis of all generated grasp success measure and corresponding object semantic feature(s) output. For example, the system may generate the end effector command to fully or substantially conform to the candidate end effector motion vector with: the grasp success measure that is most indicative of a successful grasp; and corresponding semantic feature(s) that match the desired object semantic feature(s). Also, for example, the system may generate the end effector command to fully or substantially conform to the candidate end effector motion vector with a "highest" value based on applying: its grasp success measure and its probability for a semantic feature that matches the desired object semantic feature, to a function. A control system of a robot of the system may generate motion command(s) to actuate one or more actuators of the robot to move the end effector based on the end effector motion vector.

In some iterations of block 964, the system additionally and/or alternatively generates the end effector command based on a current grasp success measure and current semantic feature(s) if no candidate end effector motion vector is utilized to generate new motion commands. For example, if one or more comparisons of the current grasp success measure to the grasp success measure determined at block 960 fail to satisfy a threshold, and the current semantic feature(s) indicate the desired object semantic features, then the end effector motion command may be a "grasp command" that causes the end effector to attempt a grasp (e.g., close digits of an impactive gripping end effector). For instance, if the result of the current grasp success measure divided by the grasp success measure determined at block 960 for the candidate end effector motion vector that is most indicative of successful grasp is greater than or equal to a first threshold (e.g., 0.9), the end effector command may be a grasp command (under the rationale of stopping the grasp early if closing the gripper is nearly as likely to produce a successful grasp as moving it). Also, for instance, if the result is less than or equal to a second threshold (e.g., 0.5), the end effector command may be a motion command to effectuate a trajectory correction (e.g., raise the gripping end effector "up" by at least X meters) (under the rationale that the gripping end effector is most likely not positioned in a good configuration and a relatively large motion is required).

Also, for instance, if the result is between the first and second thresholds, a motion command may be generated that substantially or fully conforms to the candidate end effector motion vector with the grasp success measure determined at block 960 that is most indicative of successful grasp and that also includes corresponding sematic feature (s) that correspond to the desired object semantic feature(s). The end effector command generated by the system may be a single group of one or more commands, or a sequence of groups of one or more commands.

The grasp success measure if no candidate end effector motion vector is utilized to generate new motion commands may be based on the measure for the candidate end effector motion vector utilized in a previous iteration of the method 900 and/or based on applying a "null" motion vector and the image (and optionally the additional image) at an additional iteration of blocks of method 900.

At block 966, the system determines whether the end effector command is a grasp command. If the system determines at block 966 that the end effector command is a grasp command, the system proceeds to block 968 and implements the grasp command. In some implementations, the system may optionally determine whether the grasp command results in a successful grasp (e.g., using techniques described herein) and, if not successful, the system may optionally adjust the pose of the end effector and return to block 952. Even where the grasp is successful, the system may return to block 952 at a later time to grasp another object.

If the system determines at block 966 that the end effector command is not a grasp command (e.g., it is a motion command), the system proceeds to block 970 and implements the end effector command, then returns to blocks 952, where it generates another candidate end effector motion vector. For example, at block 970 the system may implement an end effector motion command that substantially or fully conforms to the candidate end effector motion vector with the grasp success measure that is most indicative of successful grasp and that also includes semantic feature(s) that conform to the desired object semantic feature(s).

In many implementations, blocks of method 900 may be performed at a relatively high frequency, thereby enabling iterative updating of end effector commands and enabling servoing of the end effector along a trajectory that is informed by the semantic grasping model to lead to a relatively high probability of successful grasp of an object having the desired object feature(s).

FIG. 10 is a flowchart illustrating an example method 1000 of utilizing a semantic grasping model to servo a grasping end effector. For convenience, the operations of the flow chart are described with reference to a system that performs the operations. This system may include one or more components of a robot, such as a processor (e.g., CPU and/or GPU) and/or robot control system of robot 180A, 180B, 1125, and/or other robot. In implementing one or more blocks of method 1000, the system may operate over a trained semantic grasping model which may, for example, be stored locally at a robot and/or may be stored remote from the robot. Moreover, while operations of method 900 are shown in a particular order, this is not meant to be limiting. One or more operations may be reordered, omitted or added.

At block 1052, the system generates a candidate end effector motion vector. Block 1052 can share one or more aspects in common with block 952 of FIG. 9.

At block 1054, the system identifies an image that captures the end effector and one or more environmental objects. In some implementations, the system also identifies an additional image that at least partially omits the end effector. Block 1054 can share one or more aspects in common with block 954 of FIG. 9.

At block 1056, the system applies the image and the candidate end effector motion vector to a trained joint network. Block 1056 can share one or more aspects in common with block 956 of FIG. 9.

At block 1058, the system generates joint output using the joint network and the applied image and the applied end effector motion vector. Block 1058 can share one or more aspects in common with block 958 of FIG. 9.

At block 1060, the system generates output that indicates object semantic feature(s). The system generates the output based on the joint output generated at block 1058, and based on a trained semantic network. Block 1060 can share one or more aspects in common with block 962 of FIG. 9.

At block 1062, the system applies the current image and the candidate end effector motion vector to a grasp network. For example, the system can apply the current image and the candidate end effector motion vector to grasp network 125C of FIG. 1C.

At block 1064, the system generates a grasp success measure using the grasp network, and based on the applied image and the applied end effector motion vector.

At block 1066, the system generates an end effector command based on the grasp success measure of block 1064 and the object semantic feature(s) indicated by the output of block 1060. Block 1066 can share one or more aspects in common with block 964 of FIG. 9.

At block 1068, the system determines whether the end effector command is a grasp command. If the system determines at block 1068 that the end effector command is a grasp command, the system proceeds to block 1070 and implements the grasp command. Block 1068 can share one or more aspects in common with block 966 of FIG. 9. Block 1070 can share one or more aspects in common with block 968 of FIG. 9.

If the system determines at block 1068 that the end effector command is not a grasp command (e.g., it is a motion command), the system proceeds to block 1072 and implements the end effector command, then returns to blocks 1052, where it generates another candidate end effector motion vector. Block 1072 can share one or more aspects in common with block 970 of FIG. 9.

In some implementations, a group of candidate end effector motion vectors are sampled (e.g., using an optimization technique) in an iteration of method 1000. In some of those implementations, multiple loops of blocks 1052, 1062, and 1064 can be performed (serially or in parallel) in an iteration of method 1000. At each loop, a different sampled candidate end effector motion vector is utilized at block 1052 (e.g., it is generated using the optimization technique). Accordingly, at each loop a different grasp success measure is generated at block 1064 that is particularized to the sampled candidate end effector motion vector for that loop. The grasp success measures can be utilized to determine the best available (from the sampled) candidate end effector motion vector (e.g., the sampled candidate end effector motion vector with the grasp success measure most indicative of grasp success), and that best available candidate end effector motion vector utilized at blocks 1066 (i.e., its grasp success measure), 1068, and optionally 1072. In these and other manners, multiple candidate end effector motion vectors can be considered in each iteration of method 1000.

Figure 11:
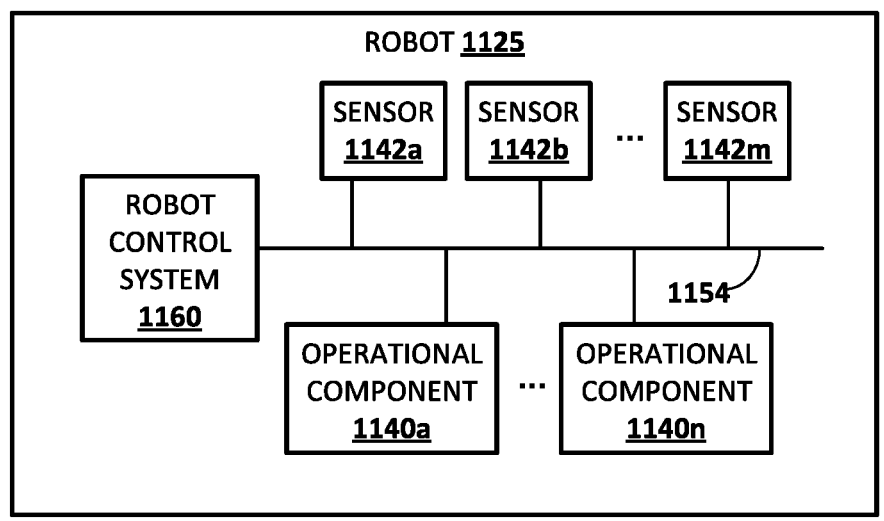
FIG. 11 schematically depicts an example architecture of a robot.

FIG. 11 schematically depicts an example architecture of a robot 1125. The robot 1125 includes a robot control system 1160, one or more operational components 1140a-1140n, and one or more sensors 1142a-1142m. The sensors 1142a-1142m may include, for example, vision sensors, light sensors, pressure sensors, pressure wave sensors (e.g., microphones), proximity sensors, accelerometers, gyroscopes, thermometers, barometers, and so forth. While sensors 1142a-m are depicted as being integral with robot 1125, this is not meant to be limiting. In some implementations, sensors 1142a-m may be located external to robot 1125, e.g., as standalone units.

Operational components 1140a-1140n may include, for example, one or more end effectors and/or one or more servo motors or other actuators to effectuate movement of one or more components of the robot. For example, the robot 1125 may have multiple degrees of freedom and each of the actuators may control actuation of the robot 1125 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 1160 may be implemented in one or more processors, such as a CPU, GPU, and/or other controller(s) of the robot 1125. In some implementations, the robot 1125 may comprise a "brain box" that may include all or aspects of the control system 1160. For example, the brain box may provide real time bursts of data to the operational components 1140a-1140n, with each of the real time bursts comprising a set of one or more control commands that dictate, inter alia, the parameters of motion (if any) for each of one or more of the operational components 1140a-1140n. In some implementations, the robot control system 1160 may perform one or more aspects of methods 300, 400, 500, and/or 700 described herein.

As described herein, in some implementations all or aspects of the control commands generated by control system 1160 in positioning an end effector to grasp an object may be based on end effector commands generated based on utilization of semantic grasping model. For example, a vision sensor of the sensors 1142a-m may capture a current image and an additional image, and the robot control system 1160 may generate a candidate motion vector. The robot control system 1160 may provide the current image, the additional image, and the candidate motion vector to a trained semantic grasping model and utilize a grasp success measure and object semantic feature(s) generated based on the applying to generate one or more end effector control commands for controlling the movement and/or grasping of an end effector of the robot. Although control system 1160 is illustrated in FIG. 11 as an integral part of the robot 1125, in some implementations, all or aspects of the control system 1160 may be implemented in a component that is separate from, but in communication with, robot 1125. For example, all or aspects of control system 1160 may be implemented on one or more computing devices that are in wired and/or wireless communication with the robot 1125, such as computing device 1210.

Figure 12:
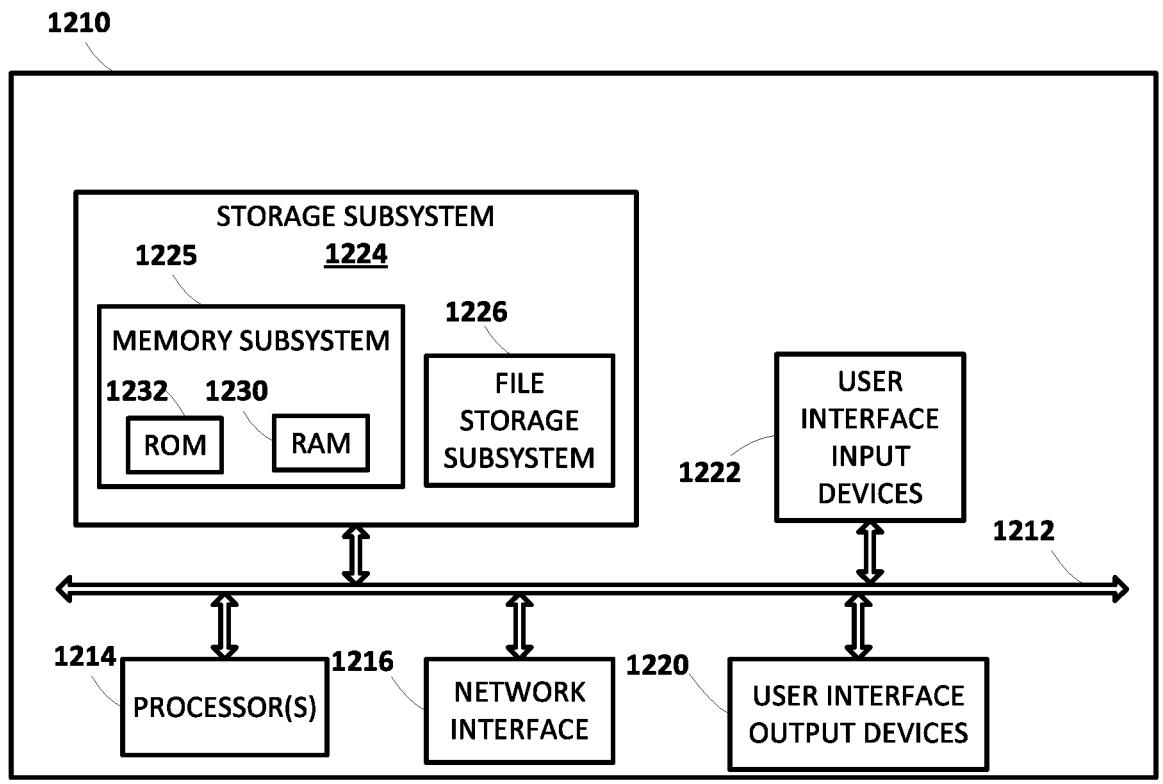
FIG. 12 schematically depicts an example architecture of a computer system.

FIG. 12 is a block diagram of an example computing device 1210 that may optionally be utilized to perform one or more aspects of techniques described herein. For example, in some implementations computing device 1210 may be utilized to provide desired object semantic feature(s) for grasping by robot 1125 and/or other robots. Computing device 1210 typically includes at least one processor 1214 which communicates with a number of peripheral devices via bus subsystem 1212. These peripheral devices may include a storage subsystem 1224, including, for example, a memory subsystem 1225 and a file storage subsystem 1226, user interface output devices 1220, user interface input devices 1222, and a network interface subsystem 1216. The input and output devices allow user interaction with computing device 1210. Network interface subsystem 1216 provides an interface to outside networks and is coupled to corresponding interface devices in other computing devices.

User interface input devices 1222 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1210 or onto a communication network.

User interface output devices 1220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1210 to the user or to another machine or computing device.

Storage subsystem 1224 stores programming and data constructs that provide the functionality of some or all of the modules described herein. For example, the storage subsystem 1224 may include the logic to perform selected aspects of the method of FIGS. 3, 4, 5, 6, 7, 9, and/or 10.

These software modules are generally executed by processor 1214 alone or in combination with other processors. Memory 1225 used in the storage subsystem 1224 can include a number of memories including a main random access memory (RAM) 1230 for storage of instructions and data during program execution and a read only memory (ROM) 1232 in which fixed instructions are stored. A file storage subsystem 1226 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1226 in the storage subsystem 1224, or in other machines accessible by the processor(s) 1214.

Bus subsystem 1212 provides a mechanism for letting the various components and subsystems of computing device 1210 communicate with each other as intended. Although bus subsystem 1212 is shown schematically as a single bus, alternative implementations of the bus subsystem may use multiple busses.

Computing device 1210 can be of varying types including a workstation, server, computing cluster, blade server, server farm, or any other data processing system or computing device. Due to the ever-changing nature of computers and networks, the description of computing device 1210 depicted in FIG. 12 is intended only as a specific example for purposes of illustrating some implementations. Many other configurations of computing device 1210 are possible having more or fewer components than the computing device depicted in FIG. 12.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
    identifying a desired object semantic feature;
    generating a candidate end effector motion vector defining motion to move a grasping end effector of a robot from a given pose to an additional pose;
    identifying an image captured by a vision component of the robot, the image capturing the grasping end effector and an object in an environment of the robot;
    applying the image and the candidate end effector motion vector as input to a trained joint neural network;
    generating a joint output based on the application of the image and the end effector motion vector to the trained joint neural network,
    wherein the trained joint neural network is trained based on:
        grasp losses generated based on grasp predictions generated over a grasp neural network based on training outputs generated using the joint neural network, and
        semantic losses generated based on semantic predictions generated over a semantic neural network based on training outputs generated using the joint neural network;
    applying the joint output to a trained version of the semantic neural network;
    generating, using the trained version of the semantic neural network based on the joint output, semantic neural network output that indicates whether the object includes the desired object semantic feature;
    generating a grasp success measure, generating the grasp success measure comprising:
        generating the grasp success measure based on application of the joint output to a trained version of the grasp neural network, or
        generating the grasp success measure based on application of the current image and the end effector motion vector to an additional trained grasp neural network;
    generating an end effector command based on the grasp success measure and the semantic model output that indicates whether the object includes the desired object semantic feature; and
    providing the end effector command to one or more actuators of the robot.

2. The method of claim 1, wherein generating the grasp success measure comprises generating the grasp success measure based on application of the joint output to the trained version of the grasp neural network.

3. The method of claim 1, wherein generating the grasp success measure comprises generating the grasp success measure based on application of the image and the end effector motion vector to the additional trained grasp neural network.

4. The method of claim 3, wherein the additional trained grasp neural network is trained independently of the grasp neural network, the joint neural network, and the semantic neural network.

5. The method of claim 1, wherein the image is not applied directly as input to the semantic neural network in generating the semantic model output.

6. The method of claim 1, wherein the joint output is the only input applied to the semantic neural network in generating the semantic model output.

7. The method of claim 1, wherein in training the joint neural network based on the grasp losses generated based on the grasp predictions generated over the grasp neural network, the grasp neural network is also trained based on the grasp losses, without training of the semantic neural network based on the grasp losses.

8. The method of claim 1, wherein in training the joint neural network based on the semantic losses generated based on the semantic predictions generated over the semantic neural network, the semantic neural network is also trained based on the semantic losses, without training of the grasp neural network based on the semantic losses.

9. The method of claim 1, wherein the desired object semantic feature defines an object classification.

10. The method of claim 1, wherein the semantic model output indicates, for each of a plurality of object classifications, a likelihood that the object has a corresponding one of the object classifications.

11. The method of claim 1, further comprising:
    receiving user interface input from a user interface input device;
    wherein identifying the desired object semantic feature is based on the user interface input.

12. The method of claim 1, further comprising:
    determining a current grasp success measure of the object without application of the motion;
    wherein generating the end effector command based on the grasp success measure comprises generating the end effector command based on comparison of the grasp success measure to the current grasp success measure.

13. The method of claim 1, wherein the end effector command is an end effector motion command and wherein generating the end effector motion command comprises generating the end effector motion command to conform to the candidate end effector motion vector.

14. The method of claim 13, wherein generating the end effector command is in response to:

determining, based on the semantic neural network output, a likelihood that the object includes the desired object feature; and determining that the likelihood satisfies one or more criteria and that the grasp success measure satisfies one or more criteria.

15. The method of claim 13, wherein generating the end effector command is in response to:

determining, based on the semantic neural network output, a likelihood that the object includes the desired object feature;

generating a value as a function of the likelihood and the grasp success measure; and determining that the value satisfies a threshold.

16. A method implemented by one or more processors, comprising:

identifying a desired object semantic feature;

generating a candidate end effector motion vector defining motion to move a grasping end effector of a robot from a given pose to an additional pose;

identifying an image captured by a vision component of the robot, the image capturing the grasping end effector and an object in an environment of the robot;

applying the image and the candidate end effector motion vector as input to a trained joint neural network;

generating a joint output based on the application of the image and the end effector motion vector to the trained joint neural network;

applying the joint output to a trained semantic neural network;

generating, using the trained semantic neural network based on the joint output, semantic neural network output that indicates whether the object includes the desired object semantic feature;

applying the joint output to a trained grasp neural network;

generating, using the trained grasp neural network based on the joint output, a grasp success measure;

generating an end effector command based on the grasp success measure and the semantic model output that indicates whether the object includes the desired object semantic feature; and providing the end effector command to one or more actuators of the robot.

17. The method of claim 16, wherein during training of the trained grasp neural network, grasp losses generated based on grasp predictions generated over the grasp neural network are utilized to update the grasp neural network and the joint prediction model, without being utilized to update the semantic neural network.

18. The method of claim 16, wherein during training of the trained semantic neural network, grasp losses generated based on semantic predictions generated over the semantic neural network are utilized to update the semantic neural network and the joint prediction model, without being utilized to update the grasp neural network.

* * * * *